United States Patent
Takahashi

(10) Patent No.: US 8,688,252 B2
(45) Date of Patent: Apr. 1, 2014

(54) REMOTE CONTROL SYSTEM AND COMMUNICATION SYSTEM

(75) Inventor: Daisuke Takahashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 350 days.

(21) Appl. No.: 13/246,703

(22) Filed: Sep. 27, 2011

(65) Prior Publication Data

US 2012/0078383 A1    Mar. 29, 2012

(30) Foreign Application Priority Data

Sep. 28, 2010 (JP) ................... 2010-217855
Sep. 28, 2010 (JP) ................... 2010-217857

(51) Int. Cl.
*G06F 19/00* (2011.01)

(52) U.S. Cl.
USPC ............................ 700/94; 348/158

(58) Field of Classification Search
USPC .................. 700/94; 348/158; 345/633, 589; 381/119
See application file for complete search history.

(56) References Cited

U.S. PATENT DOCUMENTS

| | | | | |
|---|---|---|---|---|
| 6,008,802 | A * | 12/1999 | Iki et al. | 715/721 |
| 2009/0138110 | A1 | 5/2009 | Kohyama | |
| 2009/0234478 | A1 * | 9/2009 | Muto et al. | 700/94 |

FOREIGN PATENT DOCUMENTS

| | | |
|---|---|---|
| EP | 1 715 627 A | 10/2006 |
| EP | 1 919 129 A | 5/2008 |
| JP | 2009-218937 A | 9/2009 |
| JP | 2009-218947 A | 9/2009 |

OTHER PUBLICATIONS

European Search Report mailed Jan. 12, 2012, for EP Patent Application No. 11182853.9, five pages.

* cited by examiner

*Primary Examiner* — Kidest Bahta
(74) *Attorney, Agent, or Firm* — Morrison & Foerster LLP

(57) ABSTRACT

When a controlled device has changed the value of a parameter, the controlled device transmits the result of the change as updated information UPDATE to controllers by multicast, and aside from this, also transmits synchronization data SYNC in each synchronization period by multicast. Upon detecting a reception error of those data, the controller requests, from the controlled device, the information of the parameter which has been changed in one or more synchronization periods including and after the synchronization period subsequent to the last synchronization period in which the controller could normally receive all of the packets, and corrects the parameter value in the controller based on the current value of the changed parameter transmitted from the controlled device in response to the request.

16 Claims, 18 Drawing Sheets

FIG. 9

DATA STORED IN
CONTROLLED DEVICE

| MODEL ID |
|---|
| DEVICE ID |
| IP ADDRESS |
| SYNCHRONIZATION ID SID |
| MULTICAST ID MID |
| OPERATION PARAMETERS (CURRENT MEMORY) |
| MULTICAST GROUP INFORMATION |
| VARIOUS REGISTRES |

FIG. 10

DATA STORED IN CONTROLLER

| NUMBER OF VIRTUAL DEVICES Num |
|---|
| VIRTUAL DEVICE DATA #1 |
| VIRTUAL DEVICE DATA #2 |
| ⋮ |
| VIRTUAL DEVICE DATA #Num |
| PARAMETER CONFIGURATION INFORMATION OF EACH MODEL |
| IP ADDRESS |
| MULTICAST GROUP INFORMATION |
| VARIOUS REGISTERS |

| MODEL ID |
|---|
| DEVICE ID |
| IP ADDRESS |
| SYNCHRONIZATION ID SID(dID) |
| MULTICAST ID MID(Did) |
| OPERATION PARAMETERS (VIRTUAL CURRENT MEMORY) |
| ONLINE FLAG OF(dID) |
| SYNCHRONIZAION STATUS SS(dID) |

F I G. 1 3
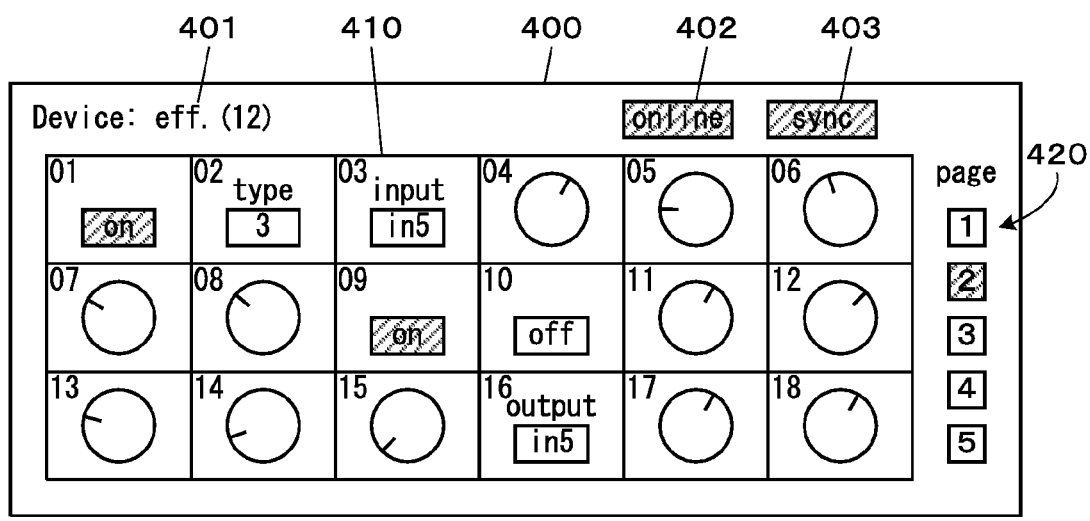

REMOTE CONTROL SYSTEM AND COMMUNICATION SYSTEM

BACKGROUND OF THE INVENTION

1. Field of the Invention

The invention relates to a remote control system in which a plurality of controllers control the values of parameters of a controlled device connected thereto via a network. The invention relates also to a communication system in which a plurality of varying data is transmitted from a first node to a plurality of second node.

2. Description of the Related Art

Conventionally, as an example of a communication system in which a plurality of varying data is transmitted from a first node to a plurality of second node, a remote control system has been known in which audio signal processors such as an amplifier and the like and a controller such as a PC (personal computer) or the like are connected via a network so that the user can control the values of parameters in the audio signal processors by operating the controller. Generally, the Ethernet (registered trademark) which has become most popular is used as the network.

It is also known that the control of the values of the parameters in such a remote control system is performed in the following procedure. Specifically, the controller which receives an instruction to change the value of a parameter from the user transmits a change command requesting to change the value of the parameter to the audio signal processor (a controlled device) being a controlled object. The audio signal processor which receives the change command then changes the data in its current memory according to the request. The audio signal processor then notifies the controller of the change result, and the controller confirms that the change has been properly performed based on the change result.

In this event, even in the case where there are a plurality of controllers, if the system is configured such that the audio signal processor notifies all of the controllers controlling the audio signal processor of the change result, not only the controller which issued the change command but also the other controllers can grasp the change result of the value of the parameter in the audio signal processor and display the new value of the parameter and so on.

Such a remote control system is described, for example, in Documents 1 and 2.

Document 1: Japanese unexamined patent publication No. 2009-218937
Document 2: Japanese unexamined patent publication No. 2009-218947

SUMMARY OF THE INVENTION

Incidentally, in the case where the remote control system or a system having data transmission function as described above is configured, the way how to send a notification of the change result of the parameter value from the audio signal processor to the controllers becomes an issue.

If the notification is not sent as soon as possible after the change, the reflection of the change in the display is delayed at the controllers other than the controller which has directly received the change instruction, whereas if the notification is sent frequently and reliably, the amount of data to be transmitted increases to lead to an increase in the load on the communication band of the network.

Such problems similarly occur even in the case where the device being the controlled object is a device other than the audio signal processor, and also in the case of trying to transmit a plurality of varying data from a first node to a plurality of second node, regardless of use of the nodes and data to be transmitted.

Regarding this point, in the system described in Document 1, the notification of the change result from the audio signal processor to the controllers is sent by broadcasting of a setting change message (see paragraph 0152). In this method, the number of packets transmitted to send the notification of the change result is small and the stress on the communication band is small, but the arrival of the notification at the controllers cannot be guaranteed. In addition, Document 1 does not disclose any particular mechanism for securing the reliability of transmission of the change result.

In the system described in Document 2, the notification of the change result from the audio signal processor to the controllers is sent by transmitting the information of the changed parameter to the controller being online with the audio signal processor or monitoring the audio signal processor through individual addressing (by unicast) (see paragraph 0077).

In the case of using Ethernet for the network layer of the OSI reference model, TCP (Transmission Control Protocol) in the transport layer is generally used for the unicast. In the transmission of parameters by unicast, the arrival is guaranteed by TCP and therefore the transmitted parameter can be surely delivered to the controllers. However, because of the circumstances such that packets corresponding to the number of controllers need to be transmitted, confirmation packets (ACK) are returned for all of the transmitted packets and so on, the number of packets transmitted on the network increases to stress the communication band of the network and increase the load on the CPU of the audio signal processing controller transmitting the parameters.

In the system described in Document 2, when the parameter values are changed, the audio signal processor does not transmit the information thereof immediately but transmits the change results in the last 10 milliseconds collectively in one packet every 10 milliseconds to thereby reduces the number of packets transmitted. However, even in this transmission, the stress on the communication band possibly increases when there are many controllers to which the change results should be sent.

The invention has been made in consideration of the above circumstances and its object is to reduce, in the case where a plurality of controllers control the values of parameters of a controlled device connected thereto via a network or a plurality of varying data is transmitted from a first node to a plurality of second node, the number of packets transmitted out to the network to thereby reduce the required communication band of the network and the processing load on the controlled device, and to realize reduction of the load on the communication band (reduction of the data amount to be transmitted), appropriate ensure of the reliability of transmission of the values of parameters, and monitor of the values of the parameters of the controlled device in the controllers with a slight time delay.

In order to achieve the above-described object, an embodiment of the remote control system of the invention is a remote control system including a plurality of controllers and a controlled device respectively connected to a network configured as follows.

The controlled device includes: a current memory storing one set of parameters, operation of the controlled device being controlled according to vales of the parameters stored in the current memory.

Each of the controllers includes, regarding the controlled device which the controller controls, a virtual current memory storing one set of parameters having same configuration as the one set of parameters stored in the current memory of the controlled device, the virtual current memory being synchronized with the current memory such that respective values of the parameters stored in the virtual current memory become identical to the values of the corresponding parameters stored in the current memory.

At least one of the controllers accepts a user operation instructing to change a value of one parameter stored in the current memory of the controlled device, and transmits, to the controlled device by unicast, a change command to instruct the controlled device to change the value of the one parameter according to the accepted user operation.

The controlled device changes, when the controlled device receives the change command from any of the controllers, the value of the one parameter stored in the current memory according to the received change command, and transmits update information representing result of the change to the plurality of the controllers by multicast.

Each of the controllers updates, when the controller receives the update information from the controlled device, a value of a parameter stored in the virtual current memory according to the received update information.

The controlled device includes: a timing generator for generating a synchronization timing periodically; a synchronization ID generator for assigning synchronization IDs to respective synchronization periods from one synchronization timing to the next synchronization timing; a change history memory for storing, when one or more values of one or more parameters in the current memory are changed in a synchronization period, one or more parameter IDs identifying the one or more parameters related to the synchronization period; a synchronization data transmitter for creating, at each synchronization timing, synchronization data including a synchronization ID specifying a next synchronization period that begins at the synchronization timing, and transmitting the created synchronization data to the plurality of the controllers by multicast.

The synchronization data transmitter includes an incorporating device for a) judging, at each synchronization timing when one synchronization period finishes, whether or not the controlled device received the correction data request including a synchronization ID from any of the controllers in the one synchronization period, and b) if received, reading all the parameter IDs stored in the change history memory related to synchronization periods from the synchronization period specified by the synchronization ID included in the correction data request to the one synchronization period, and c) incorporating, as correction data, the values of the parameters specified by the respective read parameter IDs stored in the current memory into the synchronization data to be transmitted.

Each of the controllers includes: a correction data requesting device for, when detecting error in receiving the update information or the synchronization data, transmitting a correction data request, requesting correction data, including the synchronization ID stored in the controller at a time of detecting the error, to the controlled device by unicast; and a synchronization data processor for, when the controller receives the synchronization data from the controlled device, storing the synchronization ID included in the received synchronization data, and if the correction data which the correction data requesting device requested is included in the received synchronization data, correcting one or more values of one or more parameters stored in the virtual current memory according to the correction data.

In the above remote control system, it is conceivable that the controlled device includes a local operation acceptor for accepting a user operation instructing to change a value of one parameter stored in the current memory, and when the local operation acceptor accepts the operation instructing to change a value of one parameter, the controlled device changes the value of the one parameter stored in the current memory according to the accepted operation, transmits an update information representing result of the change to the plurality of the controllers by multicast, and stores a parameter ID identifying a parameter whose value is changed according to the accepted operation into the change history memory.

Further, it is also conceivable that, among the plurality of the controllers, only one or more controllers including the virtual current memory are set up such that the controller receives the synchronization data and the update information which the controlled device transmits by the multicast.

Further, it is also conceivable that one multicast address is prepared in correspondence with the controlled device for use by the controlled device as a transmission destination of the multicast, and wherein the controllers which include the virtual current memory among the plurality of the controllers are set up such that the controller selectively receives data addressed to the multicast address corresponded to the controlled device.

It is also conceivable that the remote control system further including one or more controlled devices same as the controlled device, each of the controllers includes, regarding each of one or more controlled devices which the controller controls among the plurality of the controlled devices, a virtual current memory corresponding to the controlled device storing one set of parameters having same configuration as the one set of parameters stored in the current memory of the corresponding controlled device, each of the virtual current memory being synchronized with the corresponding current memory such that the respective values of the corresponding parameters stored in the virtual current memory become identical to the values of the corresponding parameters stored in the current memory in the corresponding controlled device, the correction data requesting device of each controller, when detecting error in receiving the update information or the synchronization data transmitted from one controlled device, transmits a correction data request, requesting correction data, including the synchronization ID stored in correspondence with the one controlled device in the controller at a time of detecting the error, to the one controlled device by unicast, and the synchronization data processor of each controller, when the controller receives the synchronization data from one controlled device, stores the synchronization ID included in the received synchronization data with correspondence with the one controlled device, and if the correction data which the correction data requesting device requested is included in the received synchronization data, corrects one or more values of one or more parameters stored in the virtual current memory corresponding to the one controlled device according to the correction data.

Another embodiment of the remote control system of the invention is a remote control system including a plurality of controllers and a plurality of controlled devices respectively connected to a network configured as follows.

Each of the controlled devices includes: a current memory storing one set of parameters, operation of the controlled device being controlled according to vales of the parameters stored in the current memory.

Each of the controllers includes, regarding each of the controlled devices which the controller controls among the plurality of the controlled devices, a virtual current memory corresponding to the controlled device storing one set of parameters having same configuration as the one set of parameters stored in the current memory of the corresponding controlled device, each of the virtual current memory being synchronized with the corresponding current memory such that respective values of the parameters stored in the virtual current memory become identical to the values of the corresponding parameters stored in the current memory in the corresponding controlled device.

At least one of the controllers accepts a user operation instructing to change a value of one parameter stored in the current memory of one of the controlled device, and transmits, to the one controlled device by unicast, a change command to instruct the one controlled device to change the value of the one parameter according to the accepted user operation.

The one controlled device changes, when the one controlled device receives the change command from any of the controllers, the value of the one parameter stored in the current memory according to the received change command, and transmits update information representing result of the change to the plurality of the controllers by multicast.

Each of the controllers updates, when the controller receives the update information from one of the controlled devices, a value of a parameter stored in the virtual current memory corresponding to the one controlled device, according to the received update information.

Each of the controlled device includes: a timing generator for generating a synchronization timing periodically; a synchronization ID generator for assigning synchronization IDs to respective synchronization periods from one synchronization timing to the next synchronization timing; a change history memory for storing, when one or more values of one or more parameters in the current memory are changed in a synchronization period, one or more parameter IDs identifying the one or more parameters related to the synchronization period; and a synchronization data transmitter for creating, at each synchronization timing, synchronization data including a synchronization ID specifying a next synchronization period that begins at the synchronization timing, and transmitting the created synchronization data to the plurality of the controllers by multicast.

The synchronization data transmitter includes an incorporating device for a) judging, at each synchronization timing when one synchronization period finishes, whether or not the controlled device received the correction data request including a synchronization ID from any of the controllers in the one synchronization period, and b) if received, reading all the parameter IDs stored in the change history memory related to synchronization periods from the synchronization period specified by the synchronization ID included in the correction data request to the one synchronization period, and c) incorporating, as correction data, the values of the parameters specified by the respective read parameter IDs stored in the current memory into the synchronization data to be transmitted.

Each of the controllers includes: a correction data requesting device for, when detecting error in receiving the update information or the synchronization data transmitted from one of the controlled devices, transmitting a correction data request, requesting correction data, including the synchronization ID stored in correspondence with the one controlled device in the controller at a time of detecting the error, to the one controlled device by unicast; and a synchronization data processor for, when the controller receives the synchronization data from one of the controlled device, storing the synchronization ID included in the received synchronization data with correspondence with the one controlled device, and if the correction data which the correction data requesting device requested is included in the received synchronization data, correcting one or more values of one or more parameters stored in the virtual current memory corresponding to the one controlled device according to the correction data.

In the above remote control system, it is conceivable that at least one of the plurality of the controlled devices includes a local operation acceptor for accepting a user operation instructing to change a value of one parameter stored in the current memory, and when the local operation acceptor of one controlled device accepts the operation instructing to change a value of one parameter, the one controlled device changes the value of the one parameter stored in the current memory according to the accepted operation, transmits an update information representing result of the change to the plurality of the controllers by multicast, and stores a parameter ID identifying a parameter whose value is changed according to the accepted operation into the change history memory.

Further, it is also conceivable that, regarding each of the plurality of the controlled devices, among the plurality of the controllers, only one or more controllers including the virtual current memory corresponding to a certain controlled device are set up such that the controller receives the synchronization data and the update information which the certain controlled device transmits by the multicast.

Further, it is also conceivable that one multicast address is respectively prepared in correspondence with each of the plurality of the controlled devices for use by the controlled device as a transmission destination of the multicast, and wherein the controllers which include the virtual current memory corresponding to a certain controlled device among the plurality of the controllers are set up such that the controller selectively receives data addressed to the multicast address corresponded to the certain controlled device.

An embodiment of the communication system of the invention is a communication system including a first node and a plurality of second nodes respectively connected to a network configured as follows.

The first node includes a first memory storing a plurality of first data which vary with time.

The first node transmits, every time any of the first data varies, a variation notification indicating result of the variation of the first data to the plurality of the second nodes by multicast.

Each of the second nodes performs, when the second node receives the variation notification from the first node, a predetermined operation according to the received variation notification.

The first node includes: a timing generator for generating a synchronization timing periodically; a synchronization ID generator for assigning synchronization IDs to respective synchronization periods from one synchronization timing to the next synchronization timing; a change history memory for storing, when any of the first data varies in each synchronization period, a data ID identifying the first data which varies, related to the synchronization period; and a synchronization data transmitter for creating, at end of each of the synchronization period, synchronization data including a synchronization ID specifying the next synchronization period, and transmitting the created synchronization data to the plurality of the second nodes by multicast.

The synchronization data transmitter includes an incorporating device for a) judging, when creating the synchronization data at the end of one synchronization period, whether or not the first node received the correction data request including a synchronization ID from any of the second nodes in the one synchronization period, and b) if received, reading all the data IDs stored in the change history memory related to the synchronization periods from the synchronization period specified by the synchronization ID included in the correction data request to the one synchronization period, and c) incorporating, as correction data, first data specified by the respective read data IDs among the first data stored in the first memory into the synchronization data to be transmitted.

Each of the second nodes includes: a correction data requesting device for, when detecting error in receiving the update information or the synchronization data, transmitting a correction data request, requesting correction data, including the synchronization ID stored in the second node at a time of detecting the error, to the first node by unicast; and a synchronization data processor for, when the second node receives the synchronization data from the first node, storing the synchronization ID included in the received synchronization data, and if the correction data which the correction data requesting device requested is included in the received synchronization data, performing correction of the predetermined operation according to the correction data.

In the above communication system, it is conceivable that each of the second nodes includes a device for judging whether or not an error occurs on the multicast communication by checking continuity of the synchronization ID included in the synchronization data when the second node receives the synchronization data.

Further, it is also conceivable that the first node includes a device for assigning sequence numbers to data to be transmitted by the multicast, and each of the second nodes includes a device for judging whether or not an error occurs on the multicast communication by checking, when the second node receives the data, continuity of the sequence numbers assigned to the received data.

It is also conceivable that a predetermined maximum size is determined for the synchronization data, the incorporating device of the first node incorporates the first data into the synchronization data as a group of partial data respectively correspond to the synchronization periods, and in a case where a size of the synchronization data exceeds the maximum size if the partial data corresponding to all of the synchronization periods requested by the received correction data request were incorporated in the synchronization data, the synchronization data transmitter determines to incorporate a part of the partial data into subsequent synchronization data, thereby reducing the size of the synchronization data to be transmitted to the maximum size or smaller.

It is also conceivable that the second node which has transmitted the correction data request repeatedly transmits the same correction data request every predetermined time until the second node receives all the first data which the second node requested by the correction data request, and if the second node cannot receive all the first data which the second node requested by the correction data request even after transmitting the correction data request predetermined times, judges that communication between the second node and the first node is cut.

It is also conceivable that the change history memory stores the data ID regarding a finite number of the synchronization period, and the first node includes a device for a) judging, when receiving the correction data request from the second node, whether or not the change history memory stores the data ID regarding all of the synchronization periods requested by the received correction data request, and b) if not, notifying the second node which sent the correction data request that connection between the second node and the first node is broken.

It is also conceivable that the predetermined operation each of the plurality of the second nodes performs according to the received variation notification is control of display according to the first data on a display device which the second node includes.

The above and other objects, features and advantages of the invention will be apparent from the following detailed description which is to be read in conjunction with the accompanying drawings.

BRIEF DESCRIPTION OF THE DRAWINGS

FIG. 9 is a diagram illustrating an example of data stored in the controlled device;

FIG. 10 is a diagram illustrating an example of data stored in the controller;

FIG. 13 is a diagram illustrating an example of a screen displaying parameters in a virtual current memory;

DETAILED DESCRIPTION OF THE PREFERRED EMBODIMENTS

Hereinafter, embodiments for carrying out the invention will be concretely described based on the drawings.

Figure 1:
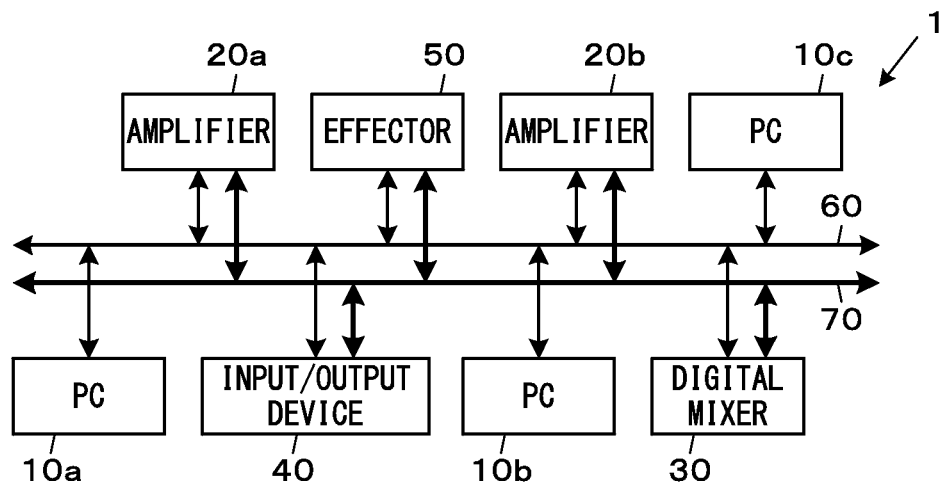
FIG. 1 is a diagram illustrating schematic configuration of a communication system that is an embodiment of a remote control system of the invention.

To begin with, a schematic configuration of a communication system that is an embodiment of a remote control system of the invention is illustrated in FIG. 1.

As illustrated in the drawing, a communication system 1 includes PCs 10a to 10c, amplifiers 20a, 20b, a digital mixer 30, an input/output device 40, and an effector 50 which are connected to one another via a control network 60. The devices other than the PCs 10a to 10c are audio signal processors which are connected to one another also via an audio network 70. For the devices represented by numerals with alphabets, the numerals without alphabets will be used when not specifying individuals.

The control network 60 is a network capable of both unicast transmission and multicast transmission, and the control network 60 transmits packets of request (command), response to the request, notification and so on among the devices connected to one another. The audio network 70 is a network for transmitting, in real time, digital waveform data (audio signals) in the audio format among the devices connected to one another. However, the invention relates to the control network, and the audio network is not essential. For example, two devices requiring transmission of audio signals may be connected to each other via a cable to constitute a system without audio network.

Both of the networks can employ any hardware and connection topology and the like, as long as they can transmit those data among the devices. Either of wired connection or wireless connection is acceptable. However, the invention provides particularly great effects when it is applied to a system utilizing wireless communication in which communication is comparatively likely to be interrupted.

For the communication protocol of the control network 60, in the case of using Ethernet for the network layer of the OSI reference model, TCP (Transmission Control Protocol) or UDP (User Datagram Protocol) is generally used for the transport layer. In this case, the unicast transmission using TCP is capable of more reliable data transmission because of delivery guarantee provided by TCP, whereas the multicast transmission using UDP does not provide the delivery guarantee by itself so that whether data has arrived cannot be judged. The invention provides the delivery guarantee at a certain level to such multicast transmission without consuming a large part of the network band and placing a heavy load on the controlled devices.

Note that the protocols of the transport layers used for the unicast transmission and the multicast transmission are not necessarily TCP and UDP respectively. Regarding the unicast transmission, the delivery guarantee is provided in many cases not only in TCP, and regarding the multicast transmission, the delivery guarantee is not provided in many cases not only in UDP.

For the audio network 70, Cobranet (trademark), EtherSound (trademark) or Dante (trademark) may be used as needed.

Among the devices constituting the communication system 1, the PC 10 is a controller, and the amplifier 20, the digital mixer 30, the input/output device 40, and the effector 50 are controlled devices whose parameter values are controlled by the PC 10.

Hereinafter, hardware configurations of the PC 10, the amplifier 20, and the digital mixer 30 as representatives will be described.

Figure 2:
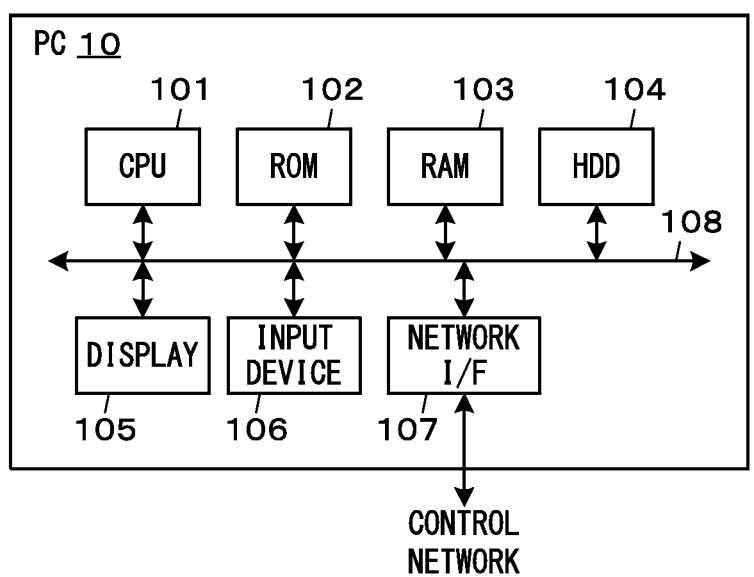
FIG. 2 is a diagram illustrating hardware configuration of the PC illustrated in FIG. 1.

First, hardware configuration of the PC 10 on which predetermined basic software (OS: operation system) runs is illustrated in FIG. 2.

As illustrated in FIG. 2, the PC 10 includes a CPU 101, a ROM 102, a RAM 103, an HDD (hard disk drive) 104, a display 105, an input device 106, and a network I/F 107 which are connected to one another via a system bus 108.

The CPU 101 executes a required application program for remote control (remote control program) on the basic software and thereby controls the whole PC 10 to implement various functions including the later-described functions as the controller, such as requesting the controlled device to change the value of a parameter following the operation of the user, synchronizing the values of the parameter between the PC 10 and the controlled device based on the notification from the controlled device, and the like.

The data (FIG. 10) prepared in the RAM 103 and used by the CPU 101 for the operation as the controller is saved in the HDD 104 as a setting file according to a user operation instructing the save or automatically at the stop of the remote control program. The setting file stored in the HDD 104 is read into the RAM 103 according to a user operation instructing load or automatically at the next start of the remote control program.

The display device 105 is a display means such as a display for presenting information to a user.

The input device 106 is an input means such as a keyboard, a pointing device or the like for accepting operation from a user.

The network I/F 107 is an interface for connecting the PC 10 to the control network 60.

For these configurations, publically-known hardware can be appropriately employed.

Figure 3:
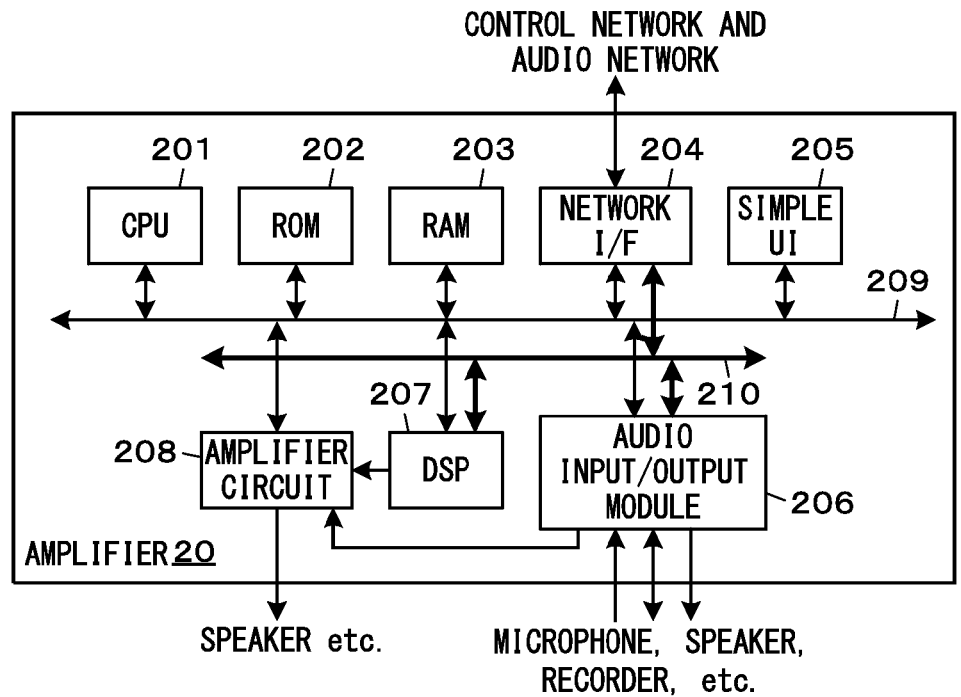
FIG. 3 is a diagram illustrating hardware configuration of the amplifier illustrated in FIG. 1.

Next, hardware configuration of the amplifier 20 is illustrated in FIG. 3.

As illustrated in FIG. 3, the amplifier 20 includes a CPU 201, a ROM 202, a RAM 203, a network I/F 204, a simple UI (user interface) 205, an audio input/output module 206, a DSP (digital signal processor) 207, and an amplifier circuit 208, which are connected to one another via a system bus 209. The network I/F 204, the audio input/output module 206, and the DSP 207 are connected to one another also via an audio bus 210 for digital waveform data transmission.

The CPU 201 executes a required program stored in the ROM 202 using the RAM 203 as a work memory and thereby controls the whole amplifier 20 to implement various functions including functions as the later-described controlled device, such as changing values of parameters stored in the current memory provided on the RAM 203 based on the request from the controller, notifying the controller of the result of the change and so on, functions of controlling signal processing in the DSP 207 and the amplifier circuit 208, and so on.

The network I/F 204 is an interface for connecting the amplifier 20 to the control network 60 and the audio network 70. The audio signals to be received by the amplifier 20 over the audio network 70 and processed in the amplifier 20 are supplied from the network I/F 204 to the audio bus 210. Conversely, the audio signals to be transmitted from the amplifier 20 to the audio network 70 are read from the audio bus 210 and transmitted to the audio network 70 by the network I/F 204.

The simple UI 205 is an operation unit composed of few buttons, a small display and so on for accepting user operation. Since almost all operation of the amplifier 20 can be performed by remote control from the controllers, the UI provided in the amplifier 20 may be simple.

The audio input/output module 206 has an input terminal connecting with audio instruments such as an external microphone, a mixer, an effector, an input/output device, a recorder and so on to accept input of digital or analog audio signals from the audio instruments, and an output terminal for outputting digital or analog audio signals to the audio instruments. The audio signals inputted from the external part into the audio input/output module 206 are supplied to the audio bus 210, and the audio signals to be outputted from the audio input/output module 206 to the external part are read and acquired from the audio bus 210. Note that the analog audio signals inputted from the external part into the audio input/output module 206 can be supplied also to the amplifier circuit 208 as analog signals.

The DSP 207 is a signal processing module which includes a signal processing circuit and performs one or more kinds of signal processing among the mixer, compressor, equalizer, channel divider, attenuator, delay and the like on a plurality of audio signals inputted from the audio bus 210 according to the various processing parameters set in the current memory, and then outputs the processed signals to the amplifier circuit 208 as digital signals or after converting them into analog signals. In short, the DSP 207 has a function of adjusting characteristics as pre-processing on the signals to be power-amplified in the amplifier circuit 208.

The amplifier circuit 208 is a circuit which performs power amplification on the analog audio signals supplied from the audio input/output module 206 or the DSP 207 and outputs the resulting signals. The output signals from the amplifier circuit 208 are supplied to a speaker and outputted as sound.

The values of parameters prescribing characteristic of audio signal processing executed by the amplifier 20 such as the signal processing executed in the DSP 207, the power amplification in the amplifier circuit 208, the signal transmission route (patch) between the input/output ports in the audio input/output module 206 and the network I/F 204 and the signal processing channels of the DSP 207 and so on in the above amplifier 20 are stored in a current memory provided in the RAM 203, and a user can remotely change and confirm the values of the parameters by operating the controller such as the PC 10.

Figure 4:
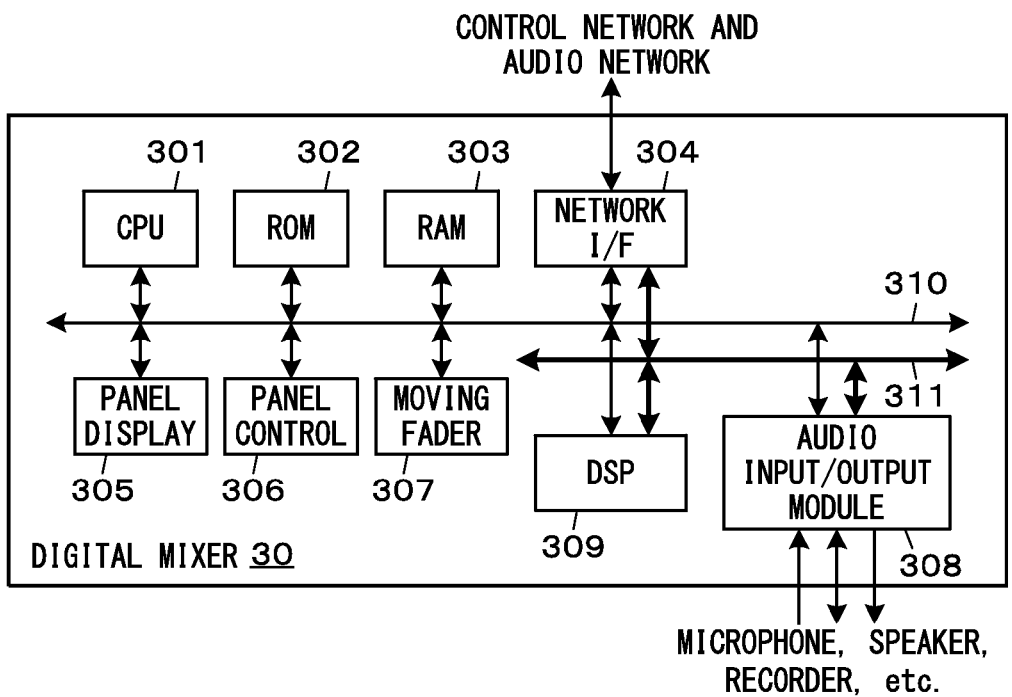
FIG. 4 is a diagram illustrating hardware configuration of the digital mixer illustrated in FIG. 1.

Hardware configuration of the digital mixer 30 is illustrated in FIG. 4.

As illustrated in FIG. 4, the digital mixer 30 includes a CPU 301, a ROM 302, a RAM 303, a network I/F 304, a panel display 305, a panel control 306, a moving fader 307, an audio input/output unit 308, and a DSP 309 which are connected to one another via a system bus 310. The network I/F 304, the audio input/output module 308, and the DSP 309 are connected also via an audio bus 311 for digital waveform data transmission.

The CPU 301 executes a required program stored in the ROM 302 using the RAM 303 as a work memory and thereby controls the whole digital mixer 30 to implement various functions including functions as the later-described controlled device and functions relating to control of the signal processing in the DSP 309 and control of values of parameters according to user operations accepted by the panel control 306 and the moving fader 307.

The network I/F 304 is an interface for connecting the digital mixer 30 to the control network 60 and the audio network 70 as in the amplifier 20.

The panel display 305 is a display means displaying various kinds of information according to control by the CPU 301. The panel display 305 can include, for example, a liquid crystal panel (LCD) and light emitting diode (LED).

The panel control 306 is for accepting operation to the digital mixer 30. The panel control 306 can include various keys, buttons, rotary encoders, sliders and the like. The panel control 306 can also be configured such that a touch panel or the like layered on an LCD is used and integrated with the panel display 305.

The moving fader 307 is a slider control provided with a driving means such as a motor or the like, and its knob can be moved to an arbitrary position by control of the CPU 301.

In the digital mixer 30, many controls and a large-size display for operation and reference of values of parameters are provided as described above on the assumption that the values of the parameters are locally edited through the direct operation of the digital mixer 30 by the user in addition to the remote control from the controller.

The audio input/output module 308 has an input terminal connecting with audio instruments such as an external microphone, an effector, an input/output device, an amplifier, a recorder and so on to accept input of digital or analog audio signals from the audio instruments and an output terminal for outputting digital or analog audio signals to the audio instruments. The audio signals inputted from the external part into the audio input/output unit 308 are supplied to the audio bus 311, and the audio signals to be outputted from the audio input/output unit 308 to the external part are read and acquired from the audio bus 311.

The DSP 309 includes a signal processing circuit and has functions of performing, on a plurality of audio signals inputted from the audio bus 311, signal processing (mixing processing) according to various processing parameters set in the current memory, including characteristic control processing on the audio signal in each of a plurality of input channels, mixing processing on the audio signals from the input channels in each of a plurality of mixing buses, characteristic control processing on the audio signal from the mixing bus in each of a plurality of output channels, and then outputting the resulting signals to the audio bus 311.

The values of parameters prescribing status of the signal processing executed in the DSP 309, the signal transmission route (patch) between the input/output ports in the audio input/output module 308 and the network I/F 304 and the signal processing channels of the DSP 309, and so on in the above digital mixer 30 are stored in the current memory provided in the RAM 303. A user can remotely change and confirm the values of the parameters also by operating the controllers such as the PC 10 or the like other than using the panel display 305, the panel control 306, and the moving fader 307.

Note that it is preferable to employ backup using a not-illustrated battery or backup using a not-illustrated flash memory to prevent loss of the parameters in the current memory of the controlled devices such as the amplifier 20, the digital mixer 30 and the like when the power is turned off and to enable to recover the parameters when the power is restored. Further, it is not essential to connect the controlled devices to the audio network 70, but the network I/Fs 204, 304 may be individually connected only to the control network 60.

The characteristic of this embodiment is the method, in the case where a plurality of controllers control values of parameters of one or more controlled devices, of transmitting a change in a value of a parameter performed by the controlled device under an instruction from a controller, to the other controllers. Hence, this point will be described next.

Figure 5:
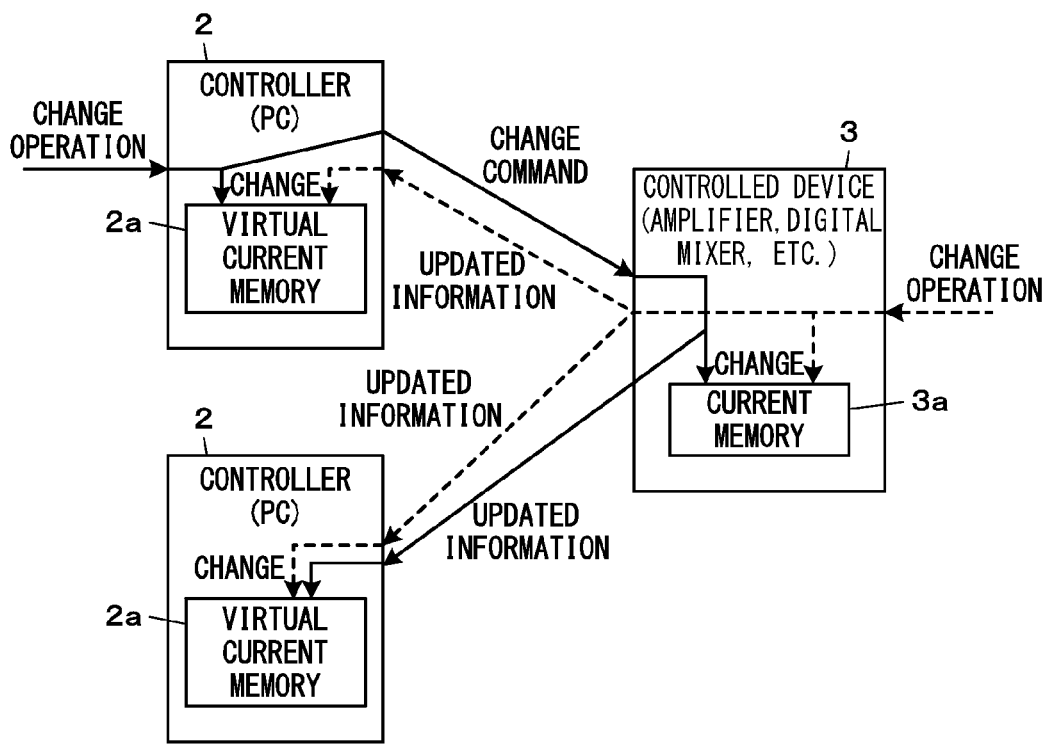
FIG. 5 is an explanatory view of procedure when changing data in the current memory of the controlled device in the communication system illustrated in FIG. 1.

First, a procedure in the communication system 1 when changing a value of a parameter stored in the current memory (data in the current memory) of the controlled device is illustrated in FIG. 5.

Incidentally, among the devices constituting the communication system 1, the device (the PC 10 in the example of FIG. 1) instructing change of the value of a parameter to another device shall be called a controller 2 and the device (the amplifier 20*a*, 20*b*, the digital mixer 30, the input/output device 40, and the effector 50 in the example of FIG. 1) which changes the value of the parameter according to the instruction from the controller 2 and transmits the results thereof to the controllers shall be called a controlled device 3 in the following description.

Further, the procedure when the data in the current memory 3*a* of the controlled device 3 is changed by remote control based on an operation accepted by the controller 2 is indicated by solid lines, and the procedure when the data in the current memory 3*a* is locally changed based on an operation accepted by the controlled device 3 itself is indicated by broken lines in FIG. 5.

In the communication system 1, each of the controllers 2, 2 has, on the RAM 103, a virtual current memory 2*a* storing the same data as the current memory 3*a* of the controlled device 3 which the controller 2 controls (or monitors), as illustrated in FIG. 5. At the start of control of the controlled device 3, the controller 2 first matches the data of the virtual current memory 2*a* with the data of the current memory 3*a* and then maintains that state of having identical values during continuation of the control.

The operation of "matching" the data of the current memory 3*a* and the virtual current memory 2*a* each other is called "synchronization" and the state that "the matching state is maintained" is called "synchronized." Following the remote control program, the CPU 101 prepares the virtual current memory 2*a* corresponding to each controlled device 3 and displays the parameters stored in the virtual current memory 2*a* on the display 105 or changes the values of the parameter stored in the virtual current memory 2*a* according to the editing operation from the user. In other words, it can be considered that a virtual device corresponding to the controlled device 3 exists in the PC 10 regarding the parameters.

When accepting a user operation instructing change of the value of a parameter in the controlled device 3, the controller 2 performs the change first on the virtual current memory 2*a*. The controller 2 then transmits a change command to the controlled device 3 to request the controlled device 3 to change the data of the current memory 3*a*. The reason why the data of the virtual current memory 2*a* are changed first here is to display the result of the user operation (new value of the parameter after the change) in good response based on the data of the virtual current memory 2*a* even when it takes long time to communicate with the controlled device 3.

The controlled device 3 which receives of the change command changes the data of the current memory 3*a* following the change command and transmits, as updated information, the result of the change or the new value of the parameter to each of the controllers 2 which controls the controlled device 3.

The controllers 2 which receive the updated information update the data of the virtual current memories 2*a* according to the updated information, whereby even the controller 2 which have not accepted the change operation can keep synchronization between the virtual current memory 2*a* and the current memory 3*a* of the controlled device 3.

It is not necessary to transmit the updated information to the controller 2 which has accepted the change operation, but the transmission enables confirmation that the change of the data of the current memory 3*a* following the change command has been surely carried out.

On the other hand, when the controlled device 3 accepts a user operation instructing to change the value of the parameter in the controlled device 3 itself, the controlled device 3 first changes the data of the current memory 3*a* according to the operation. The controlled device 3 then transmits, as updated information, the result of the change or the new value of the parameter to each of the controllers 2 which controls the controlled device 3.

The controller 2 which receives the updated information updates the data of the virtual current memory 2*a* according to the updated information, whereby the respective controllers 2 can keep synchronization between the virtual current memories 2*a* and the current memory 3*a* of the controlled device 3.

The transmission of the updated information and the change of the data of the virtual current memories 2*a* can be performed similarly both in the case of the solid lines and the case of the broken lines.

Further, all or part of the controllers 2 can also be configured to function as devices not requesting the controlled device 3 to change the value of the parameter but just synchronizing data of the virtual current memories thereof with data of the current memory 3*a* of the controlled device 3 to thereby monitor the status of the current memory 3*a*.

Figure 6:
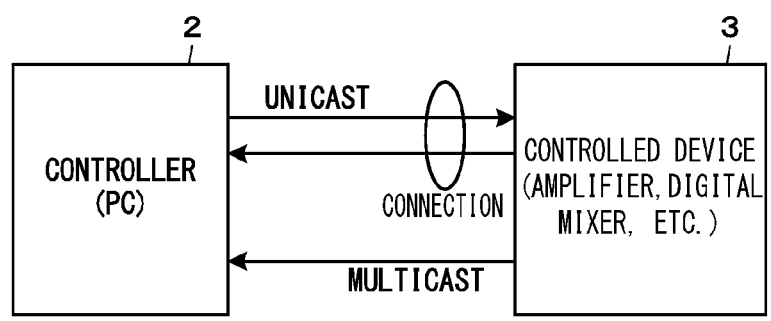
FIG. 6 is an explanatory view of communication protocol used between the controller and the controlled device when executing the procedure illustrated in FIG. 5.

Next, FIG. 6 illustrates a communication protocol used between the controller and the controlled device when the procedure illustrated in FIG. 5 is executed in the communication system 1.

As illustrated in FIG. 6, unicast and multicast are used for transmission and reception of data relating to the remote control between the controller 2 and the controlled device 3 in the communication system 1.

Among them, the unicast means transmission of data to one address corresponding to one transmission destination. A connection type communication protocol is employed here which establishes connection between a transmission source device and a transmission destination device and provides the delivery guarantee function that the transmission source device can confirm that the data has arrived at the transmission destination device by assignment of sequence numbers to packets, return of acknowledgment or the like and the transmission source device retransmit the data when the data could not have arrived. As such protocol, for example, TCP can be employed.

The multicast means transmission of data to one address corresponding to a plurality of destinations. A connectionless type communication protocol is employed here which does not establish connection or provide the delivery guarantee of data, but instead can deliver data at a high speed. As such protocol, for example, UDP can be employed. Generally, it is not guaranteed that data surely arrives at the transmission destination device in the multicast. However, the multicast has characteristics that the communication traffic required for delivering a certain same size of data to the destination is small and the load on the communication band of the network is small as compared to the unicast.

Hence, this embodiment is configured to establish both reductions in communication band and load and stability of data transmission by transmitting the change command, which needs to be surely delivered to the transmission destination, from the controller 2 to the controlled device 3 using the unicast transmission providing the delivery guarantee, transmitting the updated information, which does not cause great problem in operation even if there is a little loss of data, from the controlled device 3 to the controller 2 using the multicast transmission, and separately providing a function of correcting the data loss caused in the multicast transmission.

Next, the outline of the function of correcting the data loss will be described.

Figure 7:
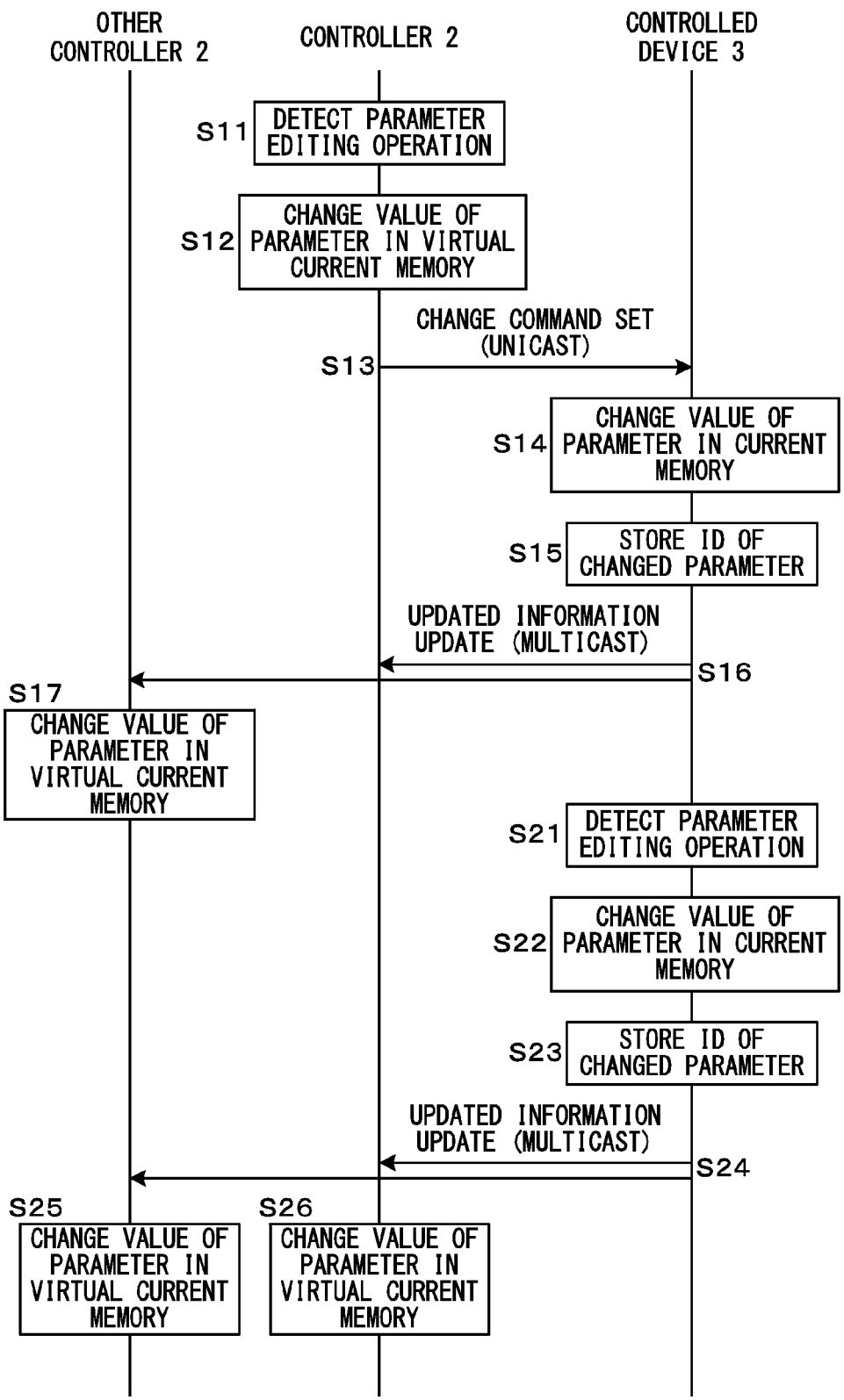
FIG. 7 is a chart illustrating an example of communication sequence between the controller and the controlled device in the communication system illustrated in FIG. 1.
Figure 8:
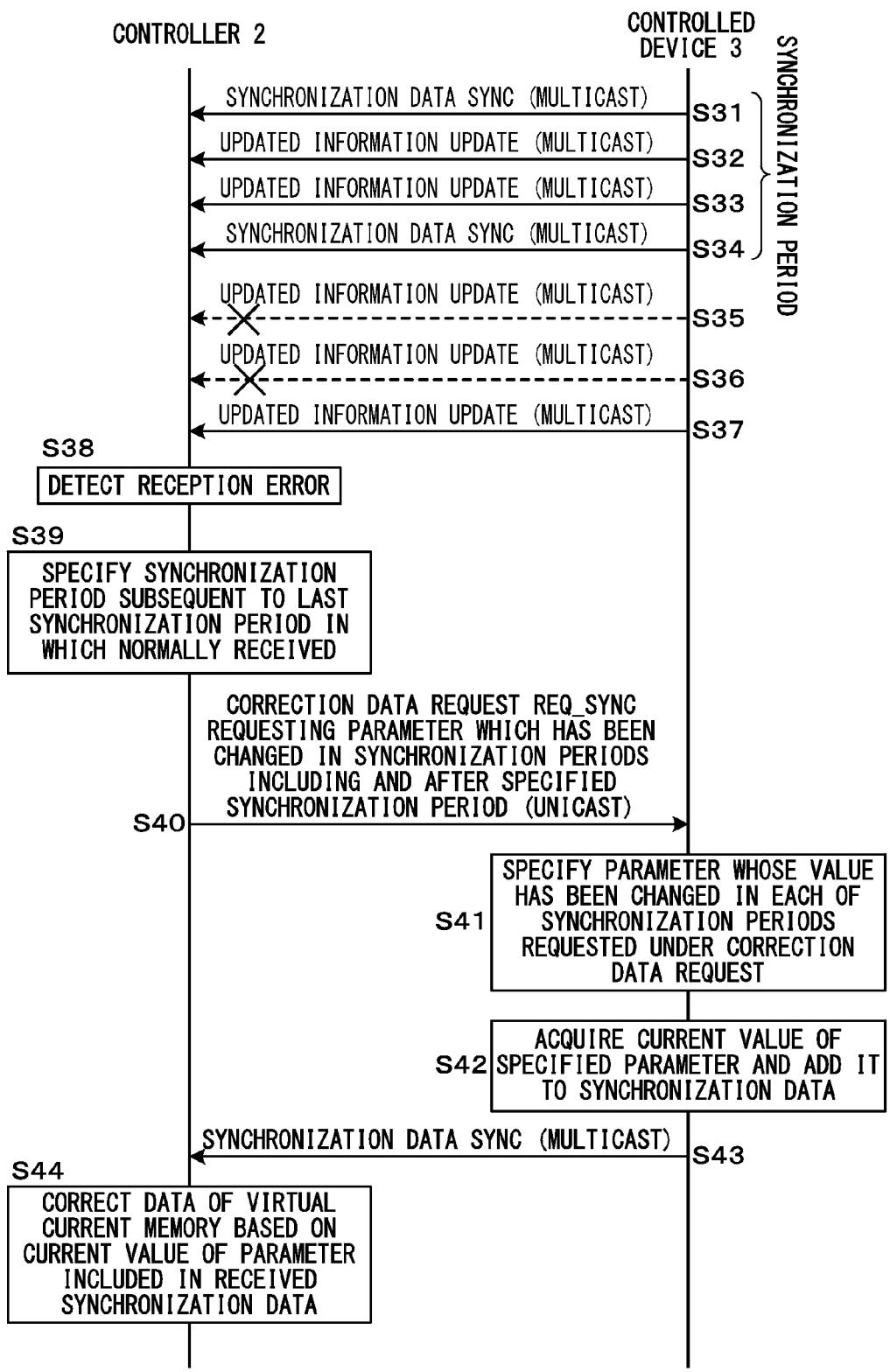
FIG. 8 is a chart illustrating another example thereof.

An example of the communication sequence between the controller 2 and the controlled device 3 in the communication system 1 is illustrated in FIG. 7 and FIG. 8.

Illustrated in FIG. 7 is the communication sequence when changing the data of the current memory 3a of the controlled device 3, in which Steps S11 to S17 are for the case that the controller 2 remotely changes the data and Steps S21 to S26 are for the case that the controlled device 3 locally accepts the change operation.

The detailed description will be omitted because it overlaps with the description of FIG. 5. In both remote and local cases, when the controlled device 3 changes the value of a parameter stored in the current memory 3a, the controlled device 3 stores the ID of the parameter (S15, S23). This is one of the points.

Illustrated in FIG. 8 is a sequence of data transmission and reception between the controller 2 and the controlled device 3 when focusing the attention on the relation between one controller 2 and the controlled device 3 over a longer span than that of FIG. 7.

As illustrated in FIG. 5 and FIG. 7, when the controlled device 3 changes the data of the current memory 3a, the controlled device 3 transmits updated information UPDATE to the controllers 2 by multicast so as to notify the controllers 2 controlling or monitoring the controlled device 3 of the result of the change (S32, S33, S35 to S37).

Aside from the updated information UPDATE, the controlled device 3 periodically transmits synchronization data SYNC to each of the controllers 2 controlling or monitoring the controlled device 3 (S31, S34). This transmission is also performed by multicast. The period from the time when the controlled device 3 once transmits the synchronization data SYNC to the time when the controlled device 3 next transmits the synchronization data SYNC is determined as one synchronization period. This synchronization period determines the execution unit of correction processing when correcting the data loss, and the synchronization data SYNC is data for transmitting the synchronization period to the controllers 2.

Since both the updated information UPDATE and the synchronization data SYNC are transmitted by multicast, the data transmitted from the controlled device 3 does not arrive at the controllers 2 in some cases (S35, S36). However, if, for example, the controlled device 3 assigns sequence numbers to packets to be transmitted by multicast, the controllers 2 can judge the presence or absence of reception error by confirming the continuity of the sequence numbers.

Upon detecting a reception error (S38), the controller 2 specifies the synchronization period subsequent to the last synchronization period in which all of the packets were able to be normally received (S39), and the controller 2 transmits a correction data request REQ_SYNC requesting the information of the parameter which has been changed in one or more synchronization periods including and after the specified synchronization period to the controlled device 3 (S40). This correction data request needs to be surely delivered to the controlled device 3 and is therefore transmitted by unicast.

Upon receiving the correction data request REQ_SYNC, the controlled device 3 specifies the parameter whose value has been changed in each of the synchronization periods requested under the correction data request based on the ID stored in Steps S15 and S23 in FIG. 7 (S41). The controlled device 3 then incorporates the current value of the specified parameter into the synchronization data SYNC to be transmitted next and transmits that synchronization data SYNC to the controller 2 (S42, S43).

The controller 2 which receives that synchronization data SYNC corrects the data of the virtual current memory 2a based on the current value of the parameter included in the received synchronization data (S44).

The above processing of Steps S39 to S44 makes it possible to store the latest value in the current memory 3a on the parameter whose value has been changed during the period when the updated information UPDATE was not received by the controller 2, into the virtual current memory 2a. Accordingly, the synchronization between the virtual current memory 2a and the current memory 3a which is considered to be flawed due to the loss of the updated information UPDATE can be restored.

Hereinafter, the processing executed by the CPUs of the controller 2 and the controlled device 3 for correcting transmission error of the data using the updated information UPDATE and the synchronization data SYNC will be described in detail.

Data, stored in the controlled device 3 and the controller 2, used for the processing of correcting the transmission error are illustrated in FIG. 9 and FIG. 10.

The controlled device 3 stores a model ID, a device ID, an IP (Internet Protocol) address, a synchronization ID (SID), a multicast ID (MID), operation parameters, multicast group information, and values of other various registers as illustrated in FIG. 9 in the RAM 203, 303.

Among them, the model ID is the identification information representing the model of the controlled device 3 and is the value set by the manufacturer of the controlled device 3.

The device ID is the identification information for identifying the individual controlled device 3 and is the value settable by the user. Therefore, the device ID is not always a unique value for each controlled device 3 and the same device ID is set for a plurality of controlled devices 3 in some cases.

The IP address is the address for use in designating the controlled device 3 as the transmission destination of unicast.

The synchronization ID is the number representing what number of synchronization period the current synchronization period is, and is changed for each synchronization period.

The multicast ID is the sequence number to be assigned to the packet multicasted next by the controlled device 3 and is changed every time the packet is multicasted.

The operation parameters are the parameters for use in audio signal processing by the controlled device 3, and the area storing the parameters corresponds to the current memory 3a. Each of the parameters of the controlled device 3 is specified by an ID unique inside the controlled device (called pID).

The multicast group information is the information representing the multicast address used to multicast a packet to the controllers 2 which controls the controlled device 3. Correspondingly to this, a multicast address at which the controller 2 receives packets sent by the multicast is set in advance in the respective controllers 2.

For instance, if there are five controllers 2a to 2e and setting is made such that three controllers 2a, 2b, 2c among them receive the multicasted packet addressed to an address A and three controllers 2a, 2c, 2d receive the multicasted packet addressed to an address B, a controlled device 3a can transmit a packet only to the controllers 2a, 2b, 2c by designating the address A as the transmission destination address of the multicast. Further, another controlled device 3b can selectively transmit a packet only to the controllers 2*a*, 2*c*, 2*d* by multicast-transmitting the packet to the address B.

In other words, one IP packet in which one group address corresponding to one group is written as the destination is selectively and concurrently received by a plurality of controllers included in the group.

As described above, the multicast group is determined so that a packet can be transmitted to all of the controllers 2 controlling or monitoring the controlled device by transmission to one multicast address for one controlled device in the communication system 1. This is because transmission of the same data to a plurality of addresses from one controlled device not only consumes excessive communication band of the network but also places a greater load on the CPU of the controlled device.

The various registers store variables whose values are changed as needed in a processing for correcting the transmission error, and details thereof will be described later in the description of the flowchart.

On the other hand, the controller 2 stores number of virtual devices, virtual device data, parameter configuration information of each model, an IP address, multicast group information, and values of other various registers as illustrated in FIG. 10 in the RAM 103.

Each of the controllers 2 can select and register an arbitrary number of devices of any models as virtual devices to be the objects of control or monitor, from a library of a plurality of models. The controller 2 then prepares a storage area for the virtual device data of each of the registered virtual devices and stores the number of the registered virtual devices Num into the RAM 103.

Even if a virtual device of the same model as that of one controlled device 3 is registered and the virtual device data corresponding thereto is prepared in one controller 2, the controller 2 is not always capable of controlling (or monitoring) the controlled device 3. If the controlled device 3 is not connected to the control network, the controller 2 cannot control (or monitor) the controlled device 3 as a matter of course, and even if the controlled device 3 is connected to the control network, the controlled device 3 is not the object of control (or monitor) unless the controller 2 is associated with the controlled device 3.

The registration of the virtual device to the controller 2 is independent for each controller, and the virtual device registered in one controller does not have to be registered in another controller. Further, since there is a case where a user wishes to control or monitor different controlled devices 3 control device by control device, it is preferable that the association between the registered virtual device and the controlled device 3 can be independently made for each controller.

Further, each piece of virtual device data includes a model ID, a device ID (abbreviation: dID), an IP address, a synchronization ID, a multicast ID, operation parameters, an online flag, and a synchronization status.

Among them, the model ID, the device ID, and the IP address are the information for specifying the controlled device 3 which is to be associated with the virtual device in later-described processing of FIG. 11. The controller 2 automatically associates, with each of the virtual devices, the controlled device 3 having the model ID, device ID, and IP address matching those of the virtual device 3, among the controlled devices 3 connected to the control network. If there is no controlled device 3 having the three IDs all of which match those of the virtual device, the controller 2 associates one of the controlled devices 3 having the matching model ID and device ID with the virtual device following the instruction of the user and stores the IP address of the associated controlled device as the IP address in the virtual device data area thereof.

The synchronization ID and the multicast ID are the values of the latest synchronization ID and multicast ID in the controlled device 3 grasped based on the data received from the controlled device 3. These values are expressed as SID(dID) and MID(dID) in FIG. 10 in the sense that they are data regarding the virtual device specified by the dID because they are managed for each virtual device.

This "dID" is managed so that the same dID is not assigned to a plurality of virtual devices in each controller 2 (dID becomes unique), and accordingly the "dID" can be regarded as the ID specifying one virtual device in each controller 2. Note that the synchronization ID and the multicast ID of each of the virtual devices in the controller 2 do not always match the synchronization ID and the multicast ID managed on side of the controlled device 3 associated therewith as described later.

The operation parameters correspond to the virtual current memory 2*a* which is synchronized with the current memory 3*a* on the controlled device 3 side. Note that the "parameter configuration information of each model" stored in the controller 2 represents the parameter configuration of the current memory 3*a* in the controlled device 3 of each model, and the storage area of the virtual current memory 2*a* having the same parameter configuration as that of the current memory 3*a* is secured on the controller 2 side based on the parameter configuration information and the model ID. Accordingly, each of the stored parameters can be specified by the pID similarly on the controlled device 3 side.

The online flag OF(dID) is a flag representing whether or not the virtual device (the controlled device 3 associated therewith) is in a state to be remotely controllable from the controller 2.

The synchronization status SS(dID) is a flag representing whether or not the data of the virtual current memory match the data of the current memory of the controlled device 3 associated with the virtual device (whether or not the current memories are synchronized). However, other than match or not match, the flag can take a value of "temporarily not match" which means that the matching state can be restored by correction of data loss.

The above virtual device data is created and saved by the CPU of the controller 2 according to a user operation or automatically when a controlled device which can be an object of the control is registered in the controller 2 as a virtual device.

The IP address illustrated on the left column is the IP address of the controller 2.

The multicast group information is a setting of the address at which the controller 2 receives the packet transmitted by multicast, namely, a setting of the multicast address to receive, and a plurality of multicast addresses can be set in each controller.

The various registers store variables whose values are changed as needed in a processing for correcting the transmission error, and details thereof will be described later in the description of the flowchart.

Hereinafter, processing using the above data will be described using flowcharts. Note that each processing will be described as being executed by the controller 2 or the controlled device 3 in the following description but actually performed by execution of a required program by the CPU in the controller 2 or the controlled device 3.

Figure 11:
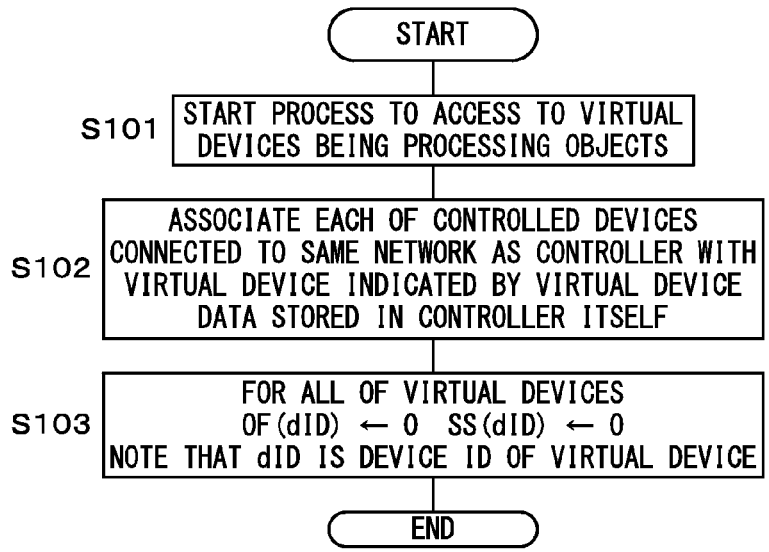
FIG. 11 is a flowchart of remote control preparation processing executed by the controller.

First, a flowchart of remote control preparation processing executed by the CPU 101 of the controller 2 is illustrated in FIG. 11. This processing is executed when a controller 2 is connected to the network constituting the communication system 1 and the controller 2 detects a controlled device 3 connected to the network (may wait for completion of detection of all controlled devices 3), when the remote control program is started in the PC 10 connected to the control network 60 and the setting file is read and the PC 10 starts the operation as the controller 2, when reset of the whole control network 60 is instructed, and the like.

In these cases, the controller 2 automatically starts the processing illustrated in FIG. 11.

In the processing of FIG. 11, the controller 2 first reads the control file including plural pieces of virtual device data, starts the process of the virtual devices registered therein, and prepares corresponding storage areas for the virtual device data in the RAM 103 and then writes corresponding data in the setting file thereinto (S101). This process is a process bearing management of a virtual device data and communication with the associated controlled devices 3, and the virtual device is created in the controller 2 when the process is activated.

Next, the controller 2 associates one controlled device 3 (real devices) detected on the control network with respective one of the virtual devices created in Step S101 (S102). Here, the controller 2 collects the model IDs, device IDs, IP addresses and so on from all of the controlled devices 3 connected to the control network, and automatically associates, with each of the virtual devices, the controlled device having the information matching those of the virtual device.

Then, the controller 2 sets the OF(dID) and the SS(dID) at 0 as the initial value for all of the virtual devices, turns off later-described online lamp 402 and synchronization lamp 403 (S103), and then ends the processing. Note that the values which the OF(dID) and the SS(dID) can take and means of the values are as indicated in Table 1.

TABLE 1

OF(dID): Online Flag
  representing whether or not the virtual device specified by the dID is online
  0 → offline (not remote controllable)
  1 → online (remote controllable)
SS(dID): Synchronization Status
  representing whether or not the data of the virtual current memory of the virtual device specified by the dID match the data of the current memory of the corresponding device
  0 → no synchronization state
    (state in which processing for synchronization is not performed)
  1 → full synchronization state (state in which synchronization is secured)
  2 → partly-flawed synchronization state
    (state in which synchronization is temporarily flawed)

The above processing ensures that the controller 2 specifies, among the virtual devices registered therein, one or more virtual devices for which corresponding real device (the controlled device 3) exists at a communicable position, and prepares remote control of the controlled device 3.

Figure 12:
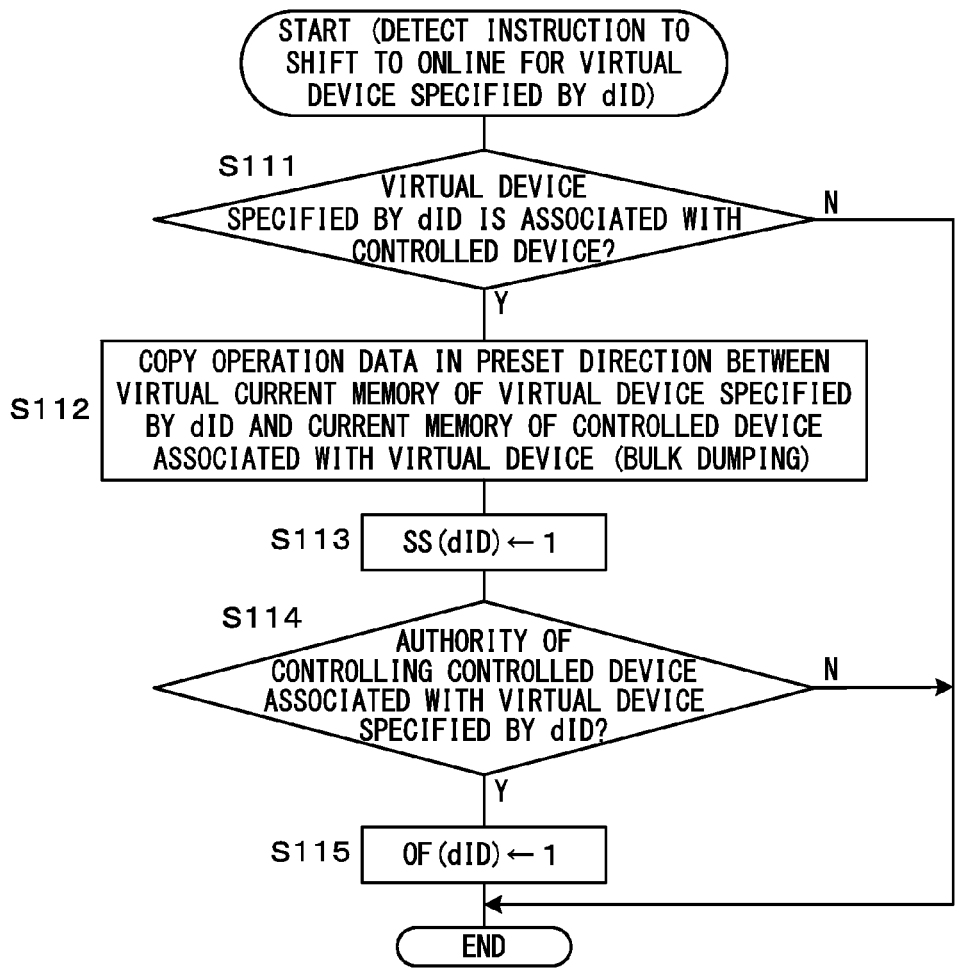
FIG. 12 is a flowchart of synchronization processing executed by the controller.

Next, a flowchart of synchronization processing executed by the CPU 101 of the controller 2 is illustrated in FIG. 12. This synchronization processing is a processing for starting remote control of the controlled device 3 (or monitoring of state of the controlled device 3) by the controller 2.

Upon accepting an instruction to start the remote control of the virtual device specified by the dID from a user, the controller 2 starts the processing illustrated in FIG. 12. Note that the instruction to start the remote control can be issued not only for each virtual device but also collectively for a group of the virtual devices. In this case, the processing in FIG. 12 is executed for each of the virtual devices constituting the group.

In the processing in FIG. 12, if the virtual device specified by the dID is associated with any of the controlled devices 3 by the processing in FIG. 11 (YES in S111), the controller 2 copies (synchronizes) the operation data (parameters) in a preset direction using the unicast transmission between the virtual current memory of the virtual device specified by the dID and the current memory of the controlled device 3 associated with the virtual device (S112). Here, the copying is performed not on a one-parameter basis but performed in such a manner that all parameters are put in one packet or dividedly put in several packets and thereby collectively copied for a plurality of parameters (bulk dumping), whereby the copying of many parameters can be efficiently completed in a short time.

Each controlled device 3 performs the signal processing according not to the parameters in the virtual current memory stored in the controller 2 but to the values of the parameters in the current memory stored in the controlled device 3 itself as described above. Hence, when giving priority to maintaining the processing state (for example, when a controller 2 is connected to the system under operation and it is desired to continue the operation of the system, and the like), it is only necessary to copy the parameters from the controlled device 3 side to the controller 2 side.

On the other hand, when it is desired that the controlled device 3 performs the signal processing according to the parameters in the virtual device stored in the controller 2 (for example, when it is desired to activate a new system, when it is desired to stop the system under operation and establish a system with another logical configuration, and the like), it is only necessary to copy the parameters from the controller 2 side to the controlled device 3 side.

The user can set the direction of copying collectively for all virtual devices or individually for each virtual device.

In whichever direction the copying is executed, the data of the virtual current memory will completely match the data of the current memory by the processing in Step S112. The controller 2 then sets the SS(dID) to 1 so as to indicate the match and turns on the synchronization lamp 403 (described later) of the virtual device (S113).

Thereafter, the controller 2 judges whether or not it has the authority of controlling the controlled device 3 associated with the virtual device specified by the dID (S114), and when the controller 2 has the right, the controller 2 sets the OF(dID) to 1, turns on the online lamp 402 (described later) of the virtual device (S115), and shifts to the state of performing remote control of the controlled device 3. The right of controlling the controlled device 3 can be set for each controller 2 or for each user logging on the controller 2 by the administrator of the communication system 1 using the display 105 and the input device 106 of the controller 2. The data of the control right set regarding each controlled device 3 is held in the RAM 203, 303 of the controlled device 3.

Alternatively, if NO in Step S111 or if NO in Step S114, the controller 2 immediately ends the processing.

The above processing ensures that the controller 2 starts remote control (if YES in Step S114) or remote monitor (if NO in Step S114) of the controlled device 3 corresponding to the virtual device specified by the dID. When the value of any of the parameters in the current memory of the controlled device 3 is changed thereafter, the controller 2 is notified of the change from the controlled device 3, and the controller 2 which receives the change notification (later-described updated information) changes the value of the corresponding parameter stored in the corresponding virtual current memory to the same value according to the change notification. In the state that a controlled device 3 and the virtual device are synchronized with each other, the values of the parameters stored in the virtual current memory of the controller 2 are identical to the values of the parameters stored in the current memory of the corresponding controlled device 3, so that the controller 2 can display the values of the parameters in the virtual current memory on the display 105 as the values of the parameters of the controlled device 3.

Note that whether or not current memory is synchronized with the corresponding virtual current memory is independent for each pair of the controller and the controlled device. Though not illustrated, in the processing of FIG. 12, when the controller 2 completes synchronization between the virtual device and the controlled device 3 (S113), the controller 2 notifies the controlled device 3 of the completion of the synchronization, and when the controller 2 establishes online (S115), the controller 2 notifies the controlled device 3 of the completion of establishment of online. The controlled device 3 can grasp the virtual device of the controller 2 with which the controlled device 3 has been synchronized (SS(dID)≠0) and whether or not the controlled device 3 has become online with the virtual device, through the notification from the controller 2.

Though not illustrated, the setting of enabling multicast is also made here. Details thereof will be described. To each of the controlled devices 3, one of addresses which are different from one another and used for multicast transmission is allocated in advance, and the multicast address is stored in the multicast group information in FIG. 9. Further, the controller 2 can inquire of each of the controlled devices 3 the multicast address used by the controlled device.

In FIG. 12, upon completion of the synchronization between a virtual device and a controlled device 3 (S113), the controller 2 notifies the router or the switch (not illustrated) controlling the routing in the control network 60 to deliver the packet addressed to the multicast address used by the controlled device 3 to the controller 2 using the known IGMP protocol (Internet Group Management Protocol), and adds the multicast address into the multicast group information in FIG. 10, thereby making setting for the controller 2 to receive the delivered packet.

By the notification and setting, the packets of the updated information UPDATE and the synchronization data SYNC (details thereof will be described later) transmitted by the controlled device 3 to the multicast address arrive at all of the controllers 2 each having the virtual devices synchronized with the controlled device 3, and the packets are received by the controllers 2. Since a plurality of controlled devices 3 use multicast addresses different from one another, the packet multicasted by each of the controlled devices 3 is delivered selectively and in parallel to one or more controllers 2 each having the virtual device synchronized with the controlled device and received by the one or more controllers 2.

As a result of the processing in FIG. 12, one controller 2 may go into a state of controlling or monitoring a plurality of controlled devices 3 or one controlled device 3 may go into a state of being controlled or monitored by a plurality of controllers 2. Further, one controller 2 may go into a state of controlling a part of a plurality of controlled devices 3 and monitoring the other part thereof, or one controlled device 3 may go into a state of being controlled by a part of a plurality of controllers 2 and monitored by the other part thereof.

In any case, it is preferable to set the multicast group of the controllers so that the packet addressed to the multicast address used for transmission by one controlled device 3 is received only by one or more controllers each having the virtual device synchronized with the one controlled device 3.

Here, an example of a screen displaying values of the parameters in the virtual current memory is illustrated in FIG. 13.

A parameter display screen 400 illustrated in the drawing is a screen displaying values of the parameters in the virtual current memory of one virtual device. If the virtual device and the controlled device 3 associated therewith are synchronized, the parameter display screen 400 displays the same values of the parameters as those in the current memory of the controlled device 3. In this screen, user operation of instructing to change the values of the parameters can be accepted.

A parameter value display section 410 is an area for performing the display and accepting the change instruction. One frame indicates a value of one parameter and displays the value of the parameter by a nob, a button or the like. The change instruction can be issued through use of a physical control on a control panel to which a selected parameter is allocated, a GUI (graphical user interface) recalled for the selected parameter or the like.

Further, it is also possible to change kinds of parameters to be displayed in the parameter value display section 410 using a page switch button 420.

The values of the parameters displayed in the parameter value display section 410 completely match the data in the current memory of the controlled device 3 except a slight timing lag while the current memory and the corresponding virtual current memory are synchronized, but may not match the data in the current memory when the synchronization is flawed as will be described later.

The parameter display screen 400 further has a device name display section 401 displaying the name of the virtual device (or the controlled device 3 associated therewith) given by the user, an online lamp 402 (turned on when OF(dID) is 1 and turned off when OF is 0) indicating whether or not the virtual device and the controlled device 3 associated therewith are online, and a synchronization lamp 403 (turned on when SS(dID) is 1, turned off when SS(dID) is 0, and blinked when SS(dID) is 2) indicating whether or not the virtual device and the controlled device 3 associated therewith are synchronized. The display of the online lamp 402 and the synchronization lamp 403 are updated in real time so that the user can grasp the latest state at all times.

Figure 14:
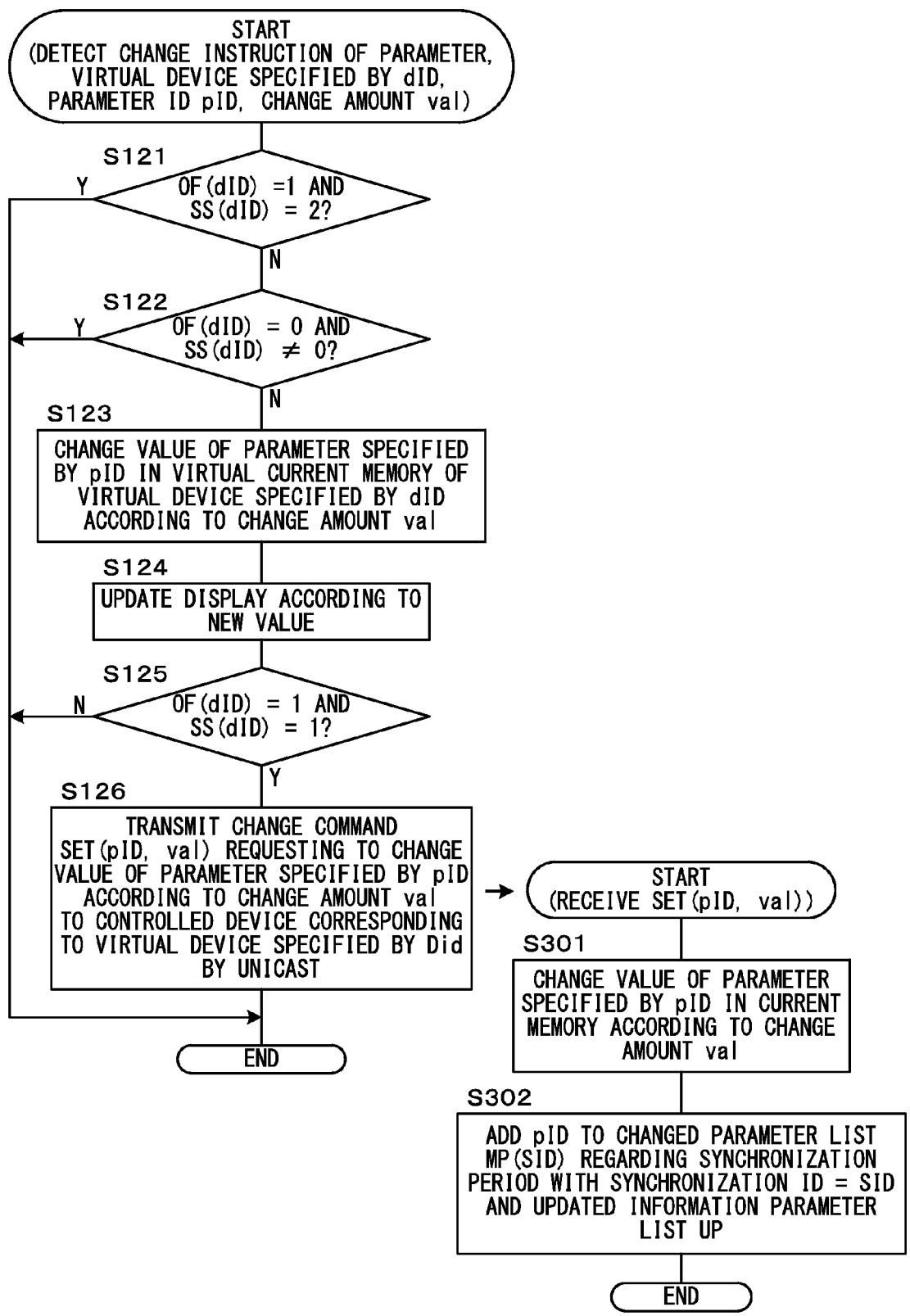
FIG. 14 is a flowchart of processing executed by the controller and the controlled device when the controller detects a change instruction regarding a parameter.

Next, flowcharts of processing executed by the CPU 101 of the controller 2 and the CPU 201 or 301 of the controlled device 3 when the controller 2 accepts a change operation regarding a parameter value from a user is illustrated in FIG. 14.

The controller 2 starts the processing illustrated in the flowchart on the left side in FIG. 14 upon detecting that an operation of changing a parameter specified by pID by a change amount val has been performed for a virtual device specified by dID (a controlled device 3 associated therewith) through the parameter display screen 400 or the like.

First, the controller 2 judges whether or not OF(dID)=1 and SS(dID)=2 (S121). If YES here, the controller 2 immediately ends the processing. When the controller 2 is remotely controlling the controlled device 3 relating to the change operation from a user, the user is possibly operating while viewing a parameter value different from the actual parameter value of the controlled device 3 in a state where synchronization between the current memory and the corresponding virtual current memory (hereinafter abbreviated as "synchronization of the current memory") is flawed, and therefore ignores the instruction so as not to change the value of the parameter until the synchronization is restored.

Note that if the controller 2 is remotely controlling the controlled device 3 (OF(dID)=1), there is no situation with no synchronization of the current memory (SS(dID)=0). Therefore, the controller 2 will practically proceed to the subsequent processing only when the current memories are synchronized (SS(dID)=1), if the controller 2 is remotely controlling the controlled device 3. The branching in Step S121 is not essential, and the controller 2 may be configured such that the processing may be unconditionally branched to NO, namely, even when the synchronization is temporarily flawed, the controller 2 can change values of the parameters while ignoring the flawed synchronization.

If NO in Step S121, the controller 2 judges whether or not OF(dID)=0 and SS(dID)≠0 (S122). If YES in Step S122, the controller 2 also immediately ends the processing. When the controller 2 is synchronized with the controlled device 3 (SS(dID)≠0: including the case where the synchronization is partially flawed) and the controller 2 is not remotely controlling the controlled device 3 (OF(dID)=0), it means that the controller 2 is remotely monitoring the controlled device 3, and therefore values of the parameters cannot be changed from the controlled device 3 side as a matter of course. On the other hand, when there is no synchronization (SS(dID)=0), the controller 2 merely locally changes the data of the virtual current memory and this change is permitted (NO in S122).

If NO also in Step S122, namely, in the case of (OF(dID), SS(dID))=(1, 1) or (0, 0) (when (1, 0 to 2) or (0, 0) if there is no branching in Step S121), the controller 2 changes, according to the detected operation, the value of the parameter specified by the pID in the virtual current memory of the virtual device specified by the dID according to the change amount val (S123), and updates the display of the parameter display screen 400 or the like according to the new value after the change (S124).

Thereafter, when OF(dID)=1 and SS(dID)=1 (S125), the controller 2 transmits, by the unicast, a change command SET(pID, val) requesting the controlled device 3 corresponding to the virtual device specified by the dID to change the value of the parameter specified by the pID according to the change amount val following the detected operation (S126), and ends the processing.

If NO in Step S125, the controller 2 is offline and there is no need to issue the instruction to the controlled device 3, and the controller 2 immediately ends the processing.

On the other hand, upon receiving the change command SET(pID, val) transmitted by the controller 2 in Step S126, the controlled device 3 starts the processing illustrated in the flowchart on the right side in FIG. 14.

The controlled device 3 then changes the value of the parameter specified by the pID in the current memory according to the change amount val (S301) and adds the pID specifying the parameter whose value has been changed to a changed parameter list MP(SID) regarding the synchronization period with the value of the synchronization ID being SID (the value representing the current synchronization period illustrated in FIG. 9) and an updated information parameter list UP (S302), and ends the processing. Note that in Step S302, it is unnecessary to register the same value again if the value of the pID has been registered in the MP(SID) and UP.

The changed parameter list MP(SID) here is a list in which IDs of parameters whose values have been changed in the controlled device 3 during the synchronization period when the value of the synchronization ID is SID.

The updated information parameter list UP is a list in which IDs of parameters whose values have been changed after the updated information UPDATE (see FIG. 7 and FIG. 8) was transmitted last time. Assuming that a period from transmission of one updated information to transmission of next updated information is regarded as an update period, the UP is a list of parameters whose values have been changed in the latest update period.

Note that the update period is preferably about several milliseconds to more than ten milliseconds, and the synchronization period is preferably about ten times to 1000 times longer than the update period, namely, about several hundred milliseconds to several seconds. According to the length of the update period, the time period (average value) of a delay until change of parameter value performed on the controlled device 3 side is reflected in the display on the controller 2 side monitoring the controlled device 3 is determined. According to the length of the synchronization period, the delay time (average value), when a communication error has been detected, until the error of the parameter in the virtual current memory is corrected is determined. Note that either of the lengths of the update period and the synchronization period is not absolute, and values other than those ranges can also be employed to operate the remote control system. However, it is desirable to make the length of the synchronization period longer enough than the update period in any case.

The above processing ensures that the controller 2 updates the data of the virtual current memory according to the detected instruction and also updates the data of the current memory of the controlled device 3 if they are online. Further, the controlled device 3 can store the kind of the changed parameter to enable to notify other controllers 2 of the result of the change on the value of the parameter afterward.

Figure 15:
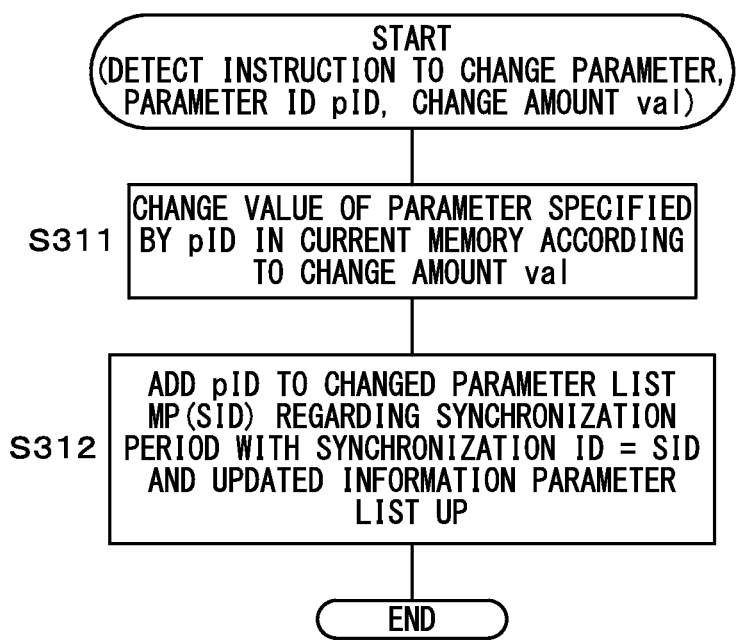
FIG. 15 is a flowchart of processing executed by the controlled device upon detecting a change instruction of a parameter.

Next, a flowchart of processing executed by the CPU 201 or 301 of the controlled device 3 when a change operation regarding a parameter is accepted from a user at the user interface 205, 305, 306 or 307 included in the controlled device 3 is illustrated in FIG. 15.

As described above, the controlled device 3 can locally accept the change instruction regarding a parameter through the control provided thereon. Upon detecting an instruction to change a parameter specified by pID by a change amount val, the controlled device 3 starts the processing illustrated in the flowchart of FIG. 15.

As with Steps S301 and S302 in FIG. 14, the controlled device 3 changes the value of the parameter specified by the pID in the current memory according to the change amount val (S311) and adds the pID to the changed parameter list MP(SID) and the updated information parameter list UP (S312), and ends the processing.

The above processing ensures that the controlled device 3 stores the kind of the changed parameter to enable to notify the controller 2 of the result of the change on the value of the parameter afterward, also when the controlled device 3 has changed the value of the parameter according to the locally accepted instruction as with the case of change according to the remotely accepted request.

Figure 16:
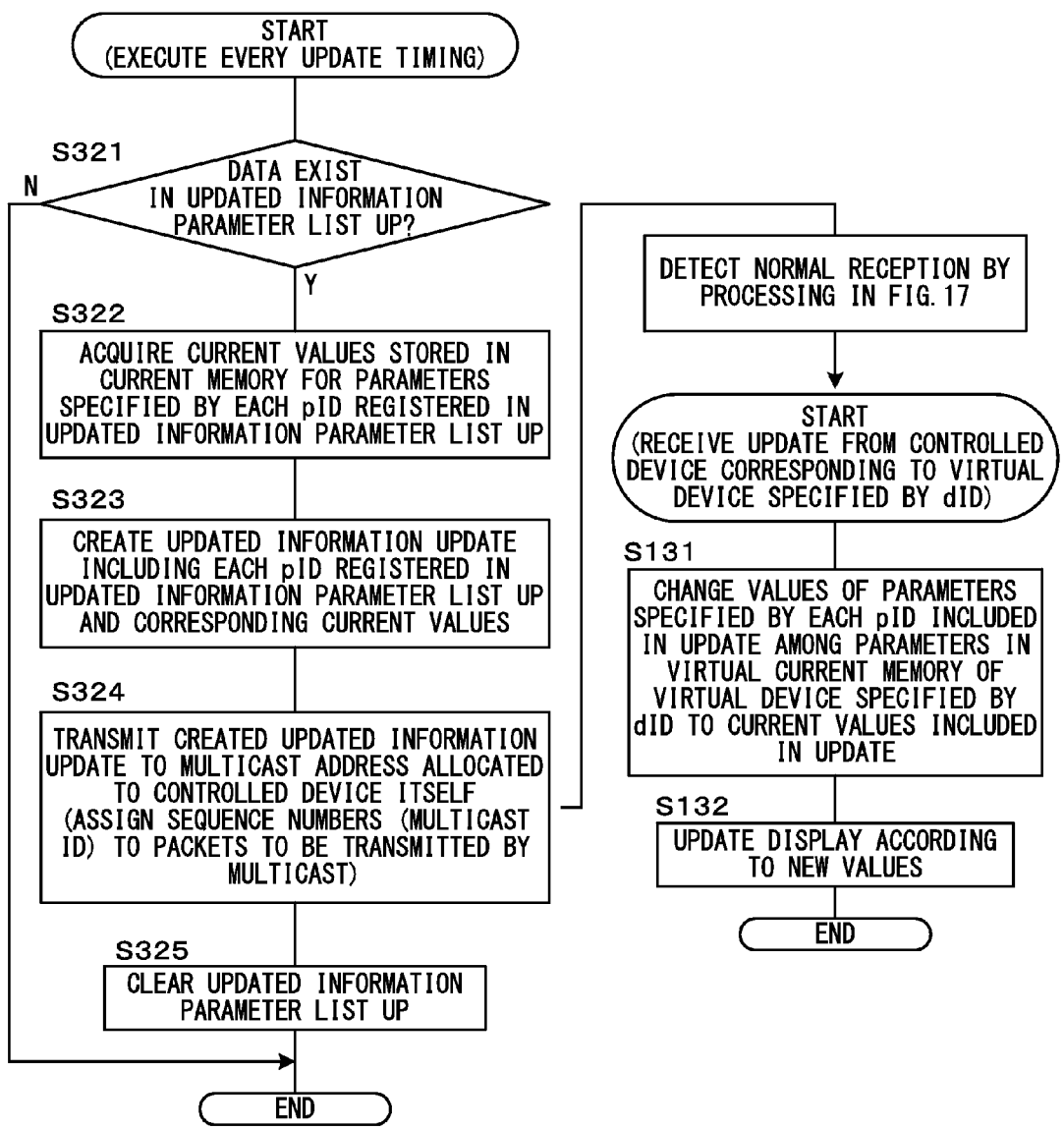
FIG. 16 is flowcharts of an updated information transmission processing executed by controlled device.

Next, a flowchart of updated information transmission processing executed by the CPU 201 or 301 of the controlled device 3 is illustrated in FIG. 16. This processing relates to transmission of the updated information UPDATE illustrated in FIG. 7 and FIG. 8.

FIG. 7 and FIG. 8 are described such that the updated information is transmitted every time value of some parameter is changed, but actually, the updated information of the parameters whose values have been changed in one update period is collectively transmitted at the end of the update period. This is because there is a case where the value of a parameter may be continuously changed in a short time such as the case where the rotary encoder is operated or the like and, in such case, the communication traffic can be reduced by collectively notifying of the change result.

Therefore, the controlled device 3 starts the processing illustrated in the flowchart on the left side in FIG. 16 at every timing to transmit the updated information UPDATE (=timing of change from one update period to the next update period).

If pID of any parameter has been registered in the updated information parameter list UP at the point in time (YES in S321), the controlled device 3 reads, for each of the registered pIDs, the current values of the parameters specified by the pID from the current memory (S322), and creates updated information UPDATE including each of the pIDs and the current values of the parameters read relating to the pID (the current values corresponding to the pID) as the data indicating the change result on the values of the parameters in the latest update period (S323). Even when the value of one parameter is changed a plurality of times in one update period, it is not necessary to incorporate the values in the middle of the update period in the updated information UPDATE because it is only necessary to present its final value.

The controlled device 3 then transmits the created updated information UPDATE to the multicast address allocated thereto (S324), clears the updated information parameter list UP (S325), and ends the processing. To a series of packets transmitted by the multicast (addressed to the multicast address) by each controlled device 3, multicast IDs which are sequence numbers in the controlled device 3 are assigned irrespective of data written therein. Here, the updated information UPDATE is transmitted by the multicast after the multicast IDs is assigned thereto. However, the multicast IDs are assigned also to packets other than the updated information UPDATE (for example, the synchronization data SYNC) as long as the packets are transmitted by the multicast, and therefore sequence numbers are not assigned to the updated information UPDATE itself.

If NO in Step S321, it is found that there is no information to be sent to the controller 2, and therefore the controlled device 3 immediately ends the processing. In other words, the updated information UPDATE is transmitted only when the value of any of the parameters in the current memory of the controlled device 3 has been changed in the update period, and the updated information UPDATE is not transmitted if the value of any parameter has not been changed.

On the other hand, when each of the controllers 2 set to receive the packet addressed to the multicast address relating to the transmission in Step S324 receives the updated information UPDATE multicast-transmitted by the controlled device 3 in Step S324 and then confirms that the controller 2 normally received the updated information UPDATE without communication error as will be described later using FIG. 17, the controller 2 starts the processing illustrated in the flowchart on the right side in FIG. 16. The device ID used for associating the controlled device 3 being the transmission source with the virtual device of the controller 2 shall be dID here.

In this processing, the controller 2 changes, based on the updated information UPDATE, the values of the parameters specified by each pID included in the UPDATE among the parameters in the virtual current memory of the virtual device specified by the dID to the current values corresponding to the pIDs included in the UPDATE (S131), and updates the display of the parameter display screen 400 and the like according to the new values after the change (S132).

The above processing ensures that each of all the controllers 2 having the virtual devices synchronized with the controlled device 3 whose parameter value has been changed changes the value of the corresponding parameter in the virtual current memory of the virtual device according to the change of the parameter value performed in the controlled device 3 to thereby maintain the state that the controlled device 3 is synchronized with the virtual device. This is the same in both cases of the change of the parameter value performed in the controlled device 3 by the remote control and by the local operation.

Note that for the controller 2 which has transmitted the change command in Step S126 of FIG. 14, reception of the updated information UPDATE from the controlled device 3 is basically notification of the same change as the change command transmitted by the controller 2 itself. However, the notification enables the controller 2 to confirm the actual new value of the parameter on the controlled device 3 side, and therefore this processing is not wasteful.

Figure 17:
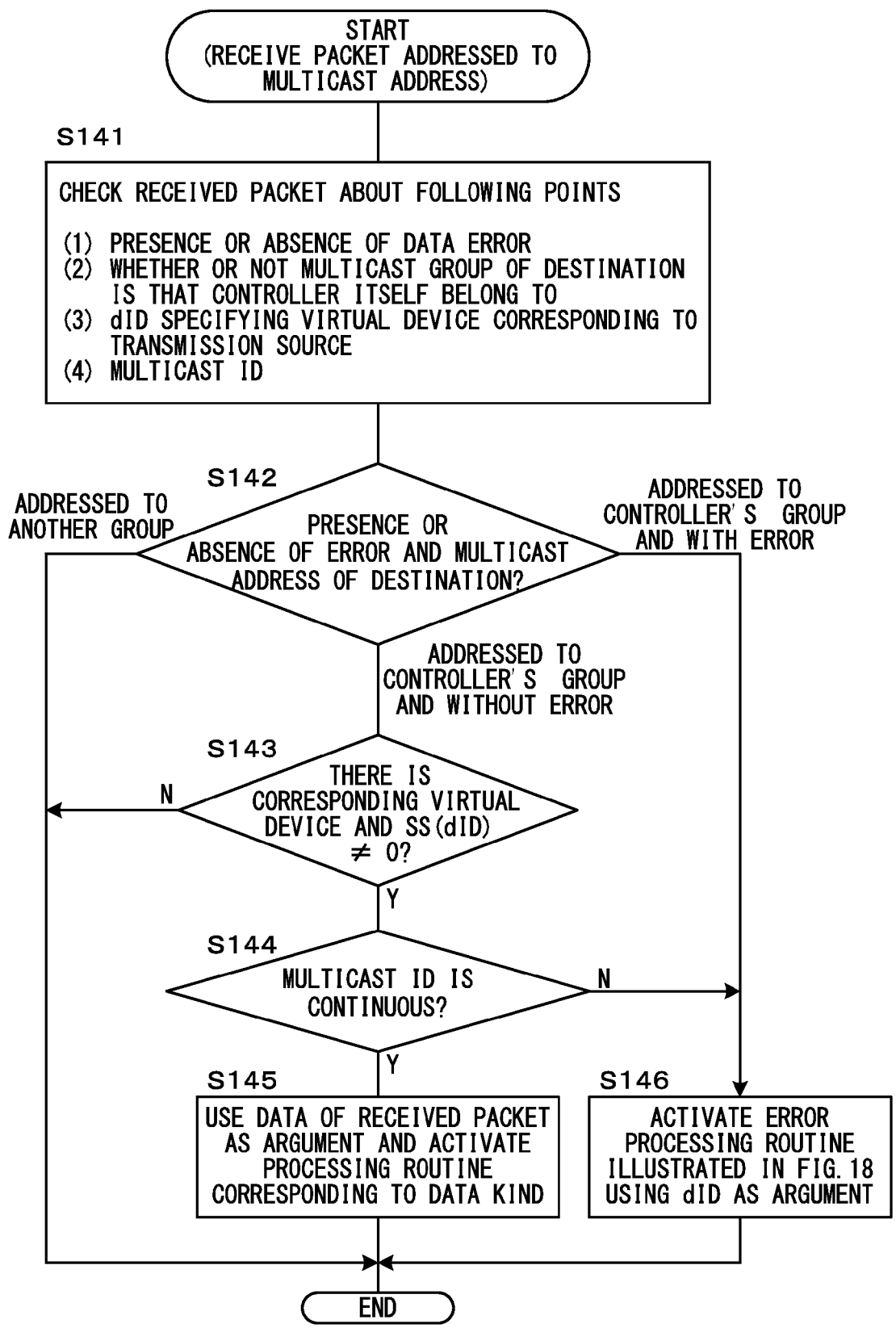
FIG. 17 is a flowchart of processing executed by the controller upon receiving a packet addressed to the multicast address.

Next, a flowchart of processing executed by the CPU 101 of the controller 2 when it has received a packet addressed to the multicast address is illustrated in FIG. 17.

Upon receiving a packet addressed to one of the multicast addresses, the controller 2 starts the processing illustrated in FIG. 17. The controller 2 first checks, about the received packet, the presence or absence of data error, the multicast group of the destination, the dID specifying the virtual device corresponding to the controlled device being the transmission source, and the multicast ID assigned to the packet (S141).

The controller 2 branches off the processing depending on the presence or absence of data error and whether or not the multicast address of the destination is the address of the group which the controller 2 itself belongs to (S142). All of the multicast addresses at which the controller 2 should receive packets are included in the multicast group information illustrated in FIG. 10.

When the packet is the one addressed not to the multicast address at which the controller 2 should receive packets, namely, addressed to another group, the controller 2 discards the packet irrespective of the presence or absence of error and therefore immediately ends the processing.

Even if it is a packet addressed to the group which the controller 2 itself belongs to but when there is data error, the controller 2 activates an error processing routine (FIG. 18) using the dID relating to the occurred multicast transmission error as an argument to perform the processing coping with the error of the packet from the controlled device associated with the virtual device specified by the dID (S146), and ends the processing.

When the packet is addressed to the group which the controller 2 itself belongs to and there is no data error in Step S142, the controller 2 judges whether or not there is a virtual device corresponding to the transmission source and the synchronization status SS(dID) of the virtual device is not 0 (S143). In other words, the controller 2 checks whether or not the transmission source is the controlled device 3 whose current memory is synchronized with the virtual current memory of the controller 2. If NO here, it is unnecessary to reflect the received packet to the data of the virtual current memory, and therefore the controller 2 immediately ends the processing.

If YES in Step S143, the controller 2 judges whether or not the multicast ID is continuous from that of the packet received from the same transmission source last time (S144). Each controlled device 3 assigns multicast IDs that are sequence numbers in the controlled device 3 to all of the packets to be transmitted by the multicast as has been described in the description of Step S324 in FIG. 16. Accordingly, upon receiving a packet transmitted by the multicast, the controller 2 detects whether or not there is a loss of the multicast IDs regarding the controlled device 3 and can thereby judge whether or not there is any packet lost after the last reception, namely, the presence or absence of communication error. Though the data written in the lost packet cannot be found, there is no need to find the data.

Hence, also in the case of NO in Step S144, the controller 2 activates the error processing routine (FIG. 18) using the dID relating to the occurred multicast transmission error as an argument to perform the processing coping with the error (lost) of the packet from the controlled device associated with the virtual device specified by the dID (S146).

If YES in Step S144, the controller 2 can judge that it has normally received the packet from the controlled device 3, and therefore uses the data in the received packet as an argument and activates a processing routine corresponding to kind of the data to perform processing on the data of the packet received from the controlled device associated with the virtual device specified by the dID (S145), and ends the processing.

Figure 21:
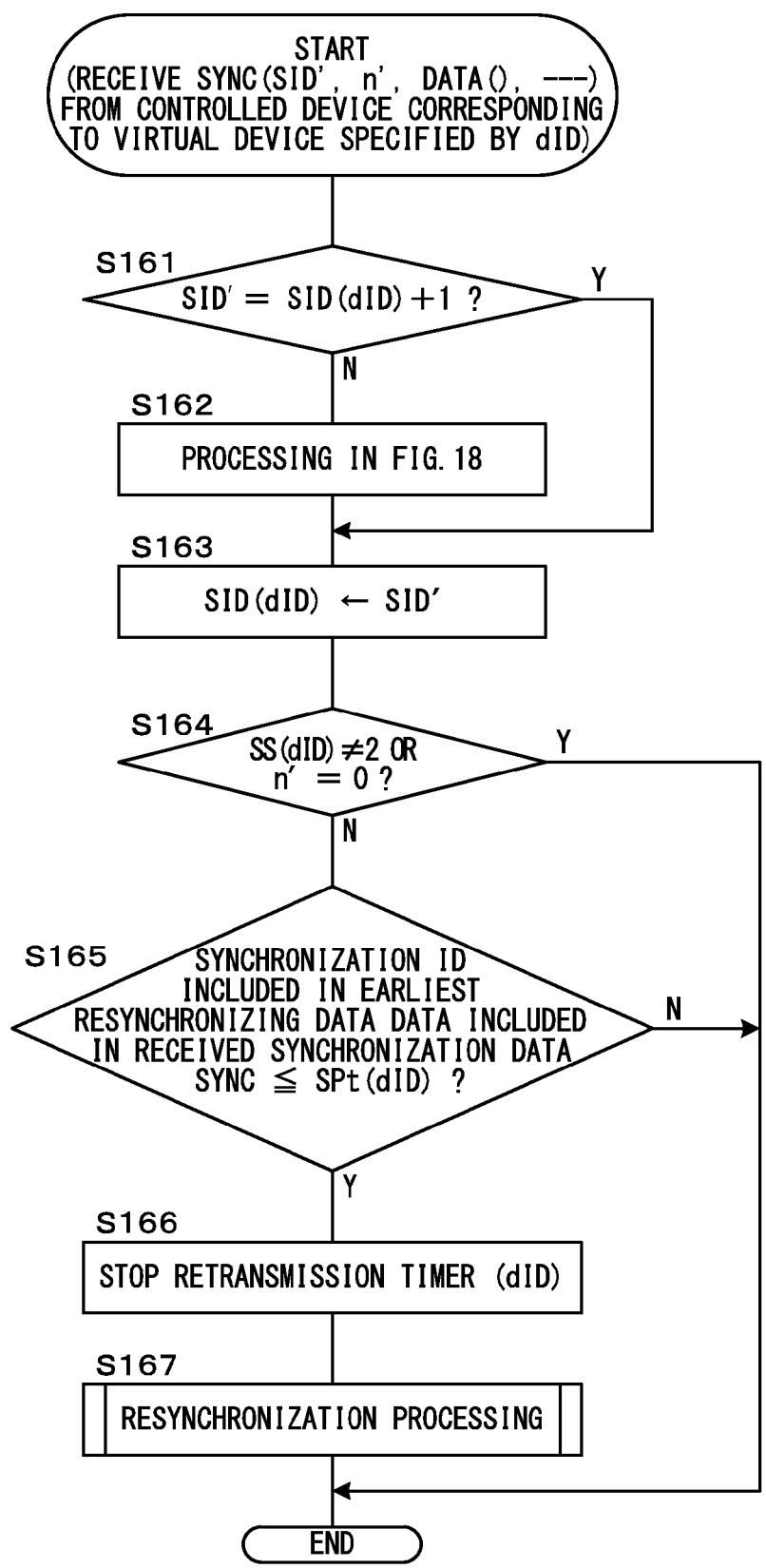
FIG. 21 is a flowchart of processing executed by the controller upon receiving synchronization data from the controlled device.

In this case, for example, when the data in the received packet is the updated information UPDATE, the processing illustrated in the flowchart on the right side in FIG. 16 is activated, whereas when the data in the received packet is the synchronization information SYNC, the processing illustrated in FIG. 21 is activated.

The above processing ensures that the controller 2 checks the presence or absence of reception error of the packet transmitted from the controlled device 3 by the multicast and then performs the processing depending on the presence or absence of error.

Note that it is preferable that the network I/F 107 performs, in place of the CPU 101, the processing relating to the judgment of the multicast address in Step S142 in order to reduce the load on the CPU 101. In this case, the network I/F 107 notifies the CPU 101 only when the network I/F 107 has received a packet addressed to the multicast address described in the multicast group information (FIG. 10) of the controller 2 and does not notify the CPU 101 even if the network I/F 107 receives a packet addressed to a multicast address other than that.

Figure 18:
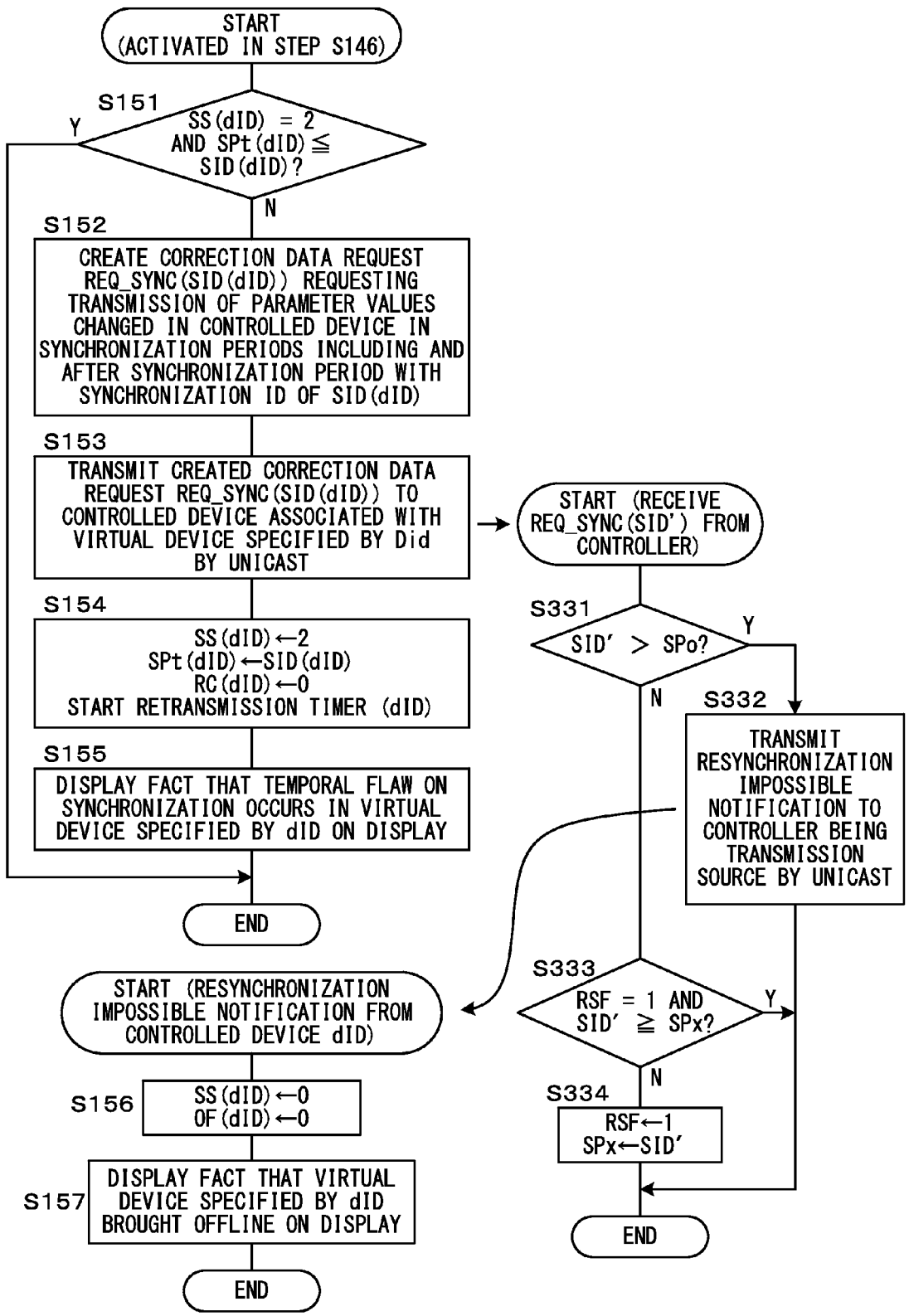
FIG. 18 is a flowchart of processing executed by the controller and the controlled device upon detecting an error in reception of a packet transmitted by multicast from the controlled device.

Next, a flowchart of processing executed by the CPU 101 of the controller 2 and the CPU 201 or 301 of the controlled device 3 when the controller 2 detects an error in reception of a packet transmitted by the multicast from the controlled device 3 is illustrated in FIG. 18. Further, various variables used in the processing described in the drawing and subsequent drawings are listed in Table 2 and Table 3. The SS(dID) is listed in Table 1.

TABLE 2

Used on the controller side

SID(dID): Synchronization ID
Synchronization ID representing the latest synchronization period based on the synchronization data received from the controlled device corresponding to the virtual device specified by the dID
SPt(dID): Synchronization required period
Synchronization ID representing the head of the synchronization required periods (synchronization periods for which synchronization of the current memory cannot be guaranteed) regarding the virtual device specified by the dID
RC(dID): Retransmission Counter
Counter counting the number of retransmission of a correction data request REQ_SYNC regarding the virtual device specified by the dID TABLE 2-continued Used on the controller side Retransmission Timer (dID)
Timer for measuring the timing to retransmit a correction data request REQ_SYNC regarding the virtual device specified by the dID

TABLE 3

Used on the controlled device side

SID: Synchronization ID of the latest synchronization period
SPo: Synchronization ID of the earliest synchronization period for which the changed parameter list is saved
SPx: Synchronization ID of the earliest synchronization period for which the parameter values need to be transmitted to the controller
RSF: Correction data request flag
   0 → absence of parameter value which should be sent to the controller
   1 → presence of parameter value which should be sent to the controller
HN: Number of synchronization periods for which the changed parameter list is held (a fixed value set in advance)

The controller 2 starts the error processing illustrated in the flowchart on the upper left in FIG. 18 by the activation in Step S146 in FIG. 17

The controller 2 first judges whether or not SS(dID)=2 and SPt(dID)≤SID(dID) (S151). If YES here, SS(dID)=2, which shows the state that the synchronization of the current memory is temporarily flawed at present and the controller 2 is trying to restore the synchronization. Further, SPt(dID) ≤SID(dID) shows that the controller 2 has already requested, from the corresponding controlled device 3, data for correcting transmission error which is to be requested in response to the present error.

On the other hand, NO in Step S151 means that the controller 2 has not requested yet, from the corresponding controlled device 3, data for correcting transmission error which is to be requested in response to the present error.

Figure 19:
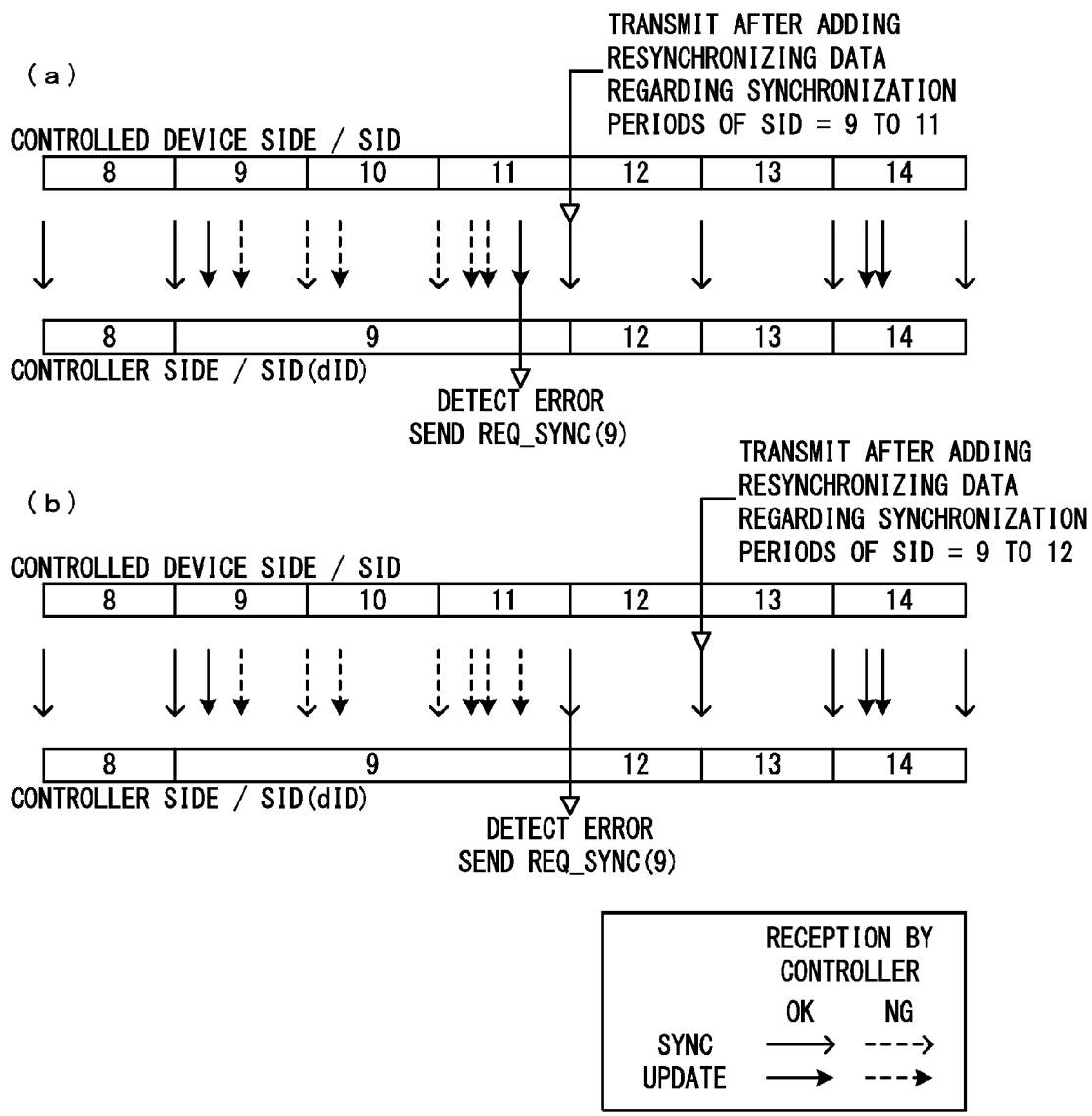
FIG. 19 is a chart for explaining timing of detection of an error in reception of packets transmitted by multicast at the controller.

Here, a concrete example of the timing of detection of an error in reception of packets transmitted by multicast at the controller 2 is illustrated together with the changes of the synchronization ID on the controlled device 3 side and the controller 2 side in FIG. 19.

Value of the SID being the synchronization ID on the controlled device 3 side changes in each predetermined synchronization timing as will be described later using FIG. 20 and, at the synchronization timing, the controlled device 3 transmits the synchronization data SYNC to inform the controller 2 of the change. For example, at the timing when the SID changes from 8 to 9, the controlled device 3 transmits the synchronization data SYNC including information that the next synchronization ID is 9.

Upon normally receiving the synchronization data SYNC, the controller 2 changes the SID(dID) that is the synchronization ID relating to the controlled device 3 stored in the controller 2 to the value included in the synchronization data SYNC. This changes the SID(dID) of the controller 2 and the SID of the controlled device 3 to the same value at substantially the same timing as long as the controller 2 normally receives the synchronization data SYNC.

However, in the case where the synchronization data SYNC does not arrive at the controller 2 for some reason such as the synchronization data SYNC at the timing when the SID changes from 9 to 10 or from 10 to 11 in FIG. 19, even when the value of the SID changes in the controlled device 3, the controller 2 does not recognize the change and the value of the SID(dID) does not change. However, it can be said that this enables the value of the SID(dID) to be maintained without change until the controller 2 receives a packet again.

Accordingly, as well as when the controller 2 recognizes the occurrence of error before the SID changes in the controlled device 3, even if the value of the SID has changed on the controlled device 3 side until the recognition, the controller 2 can recognize that the period in which there is probability that the controller 2 could not receive some packet is the period including and after the synchronization period when the value of the SID in the controlled device 3 is the SID(dID) at error detection, that is, 9 in the example of FIG. 19.

This is the same in both cases that the controller 2 has detected an error when receiving the packet of the synchronization data SYNC as illustrated at (a) and that the controller 2 has detected an error when receiving the updated information UPDATE as illustrated at (b).

Returning to the explanation of FIG. 18, the above shows that if NO in Step S151, if the controller 2 can acquire the parameter value changed on the controlled device 3 side in a period there is probability that the controller 2 could not receive some packet, the synchronization can be restored by reflecting the acquired parameter value into the virtual current memory. Hence, the controller 2 creates a correction data request REQ_SYNC (SID(dID)) having the value of the SID (dID) as a parameter and requesting transmission of the parameter values changed in the synchronization periods including and after the synchronization period specified by the parameter (S152), and transmits the correction data request REQ_SYNC (SID(dID)) to the controlled device 3 associated with the virtual device specified by the dID (S153). This transmission corresponds to transmission of the REQ_SYNC (9) in FIG. 19 and is performed by the unicast so that it surely arrives at the controlled device 3.

Then, the controller 2 sets the SS(dID) to 2 representing that synchronization is temporarily flawed in the virtual device specified by the dID, and sets the synchronization required period SPt(dID) to the SID(dID) being the ID of the first synchronization period in which synchronization of the current memory cannot be guaranteed. The controller 2 further sets the retransmission counter RC(dID) indicating the number of transmission times of the correction data request REQ_SYNC to 0 as the initial value, and starts the retransmission timer (dID) being a hardware for measuring the retransmission timing (in each predetermined time period) of the correction data request REQ_SYNC (S154). The controller 2 further displays the fact that a temporal flaw on synchronization occurs in the virtual device specified by the dID, for example, by the synchronization lamp 403 in the parameter display screen 400 of the display (S155), and ends the processing.

On the other hand, upon receiving the correction data request REQ_SYNC from the controller 2, the controlled device 3 starts the processing illustrated in the flowchart on the right side in FIG. 18. This processing is executed irrespective of which controller 2 sent the request the controlled device 3 has received. However, since the controlled device 3 grasps the controllers 2 which have the virtual devices synchronized (SS(dID)≠0) with the controlled device 3 as described above, the controlled device 3 may execute the processing only when there is a request from the controllers 2.

The used variables are not managed for each controller 2 (therefore, there is no description of "(dID)"). Further, it is not necessary that the controlled device 3 grasps how the parameter value in the correction data request REQ_SYNC is determined on the controller 2 side, and it is necessary only to acquire the value. It is assumed that the value is SID' here.

In this processing, the controlled device 3 first judges whether or not SID'<Spo (S331). If YES here, the controlled device 3 judges that the controlled device 3 has already discarded the changed parameter list MP regarding the synchronization period in accordance with the request from the controller 2 and cannot respond to the request. Hence, the controlled device 3 transmits, by the unicast, a resynchronization impossible notification representing that the lost data cannot be corrected and the controller 2 should recognize the connection with the controlled device 3 as having been lost, to the controller 2 being the transmission source of the correction data request REQ_SYNC (S332).

The controller 2 which receives the resynchronization impossible notification can grasp that it is impossible to restore the synchronization of the current memory with respect to the controlled device 3, and therefore sets the SS(dID) and the OF(dID) to 0 respectively by the processing illustrated in the flowchart on the lower left in FIG. 18 (S156) to bring the controlled device 3 offline, and turns off the synchronization lamp 403 and the online lamp 402 of the virtual device to thereby display the fact on the display (S157).

If NO in Step S331, the controlled device 3 judges that the controlled device 3 can satisfy the request from the controller 2. The controlled device 3 then judges whether or not RSF=1 and SID'≥SPx (S333).

If YES here, the parameter values in the synchronization periods including the synchronization period relating to the request this time have been already determined to be transmitted based on the correction data request received in the past (regardless of which controller 2 sent the correction data request the controlled device 3 has received), and the controlled device 3 ends the processing without making particular setting here.

On the other hand, if NO in Step S333, the parameter values in all of the synchronization periods in accordance with the request this time are not transmitted if nothing is done, and therefore the controlled device 3 sets the correction data request flag RSF to 1 indicating that there are parameter values which should be transmitted to the controller 2, and sets the SPx to the SID' as the synchronization ID of the earliest synchronization period for which it is necessary to transmit the parameter value to the controller 2, based on the request from the controller 2 (S334). These kinds of data are referred to in the processing of FIG. 20.

The above processing ensures that upon detecting an error in the reception of the updated information UPDATE or the synchronization data SYNC transmitted from the controlled device 3 by multicast, the controller 2 requests the controlled device 3 to transmit the parameter values changed in and after the synchronization period indicated by the synchronization ID stored at the point in the detection time. Further, if the controlled device 3 can satisfy the request, the controlled device 3 can make necessary setting so as to incorporate the requested parameter values into the synchronization data SYNC and transmit the resulting synchronization data SYNC at the next transmission.

Figure 20:
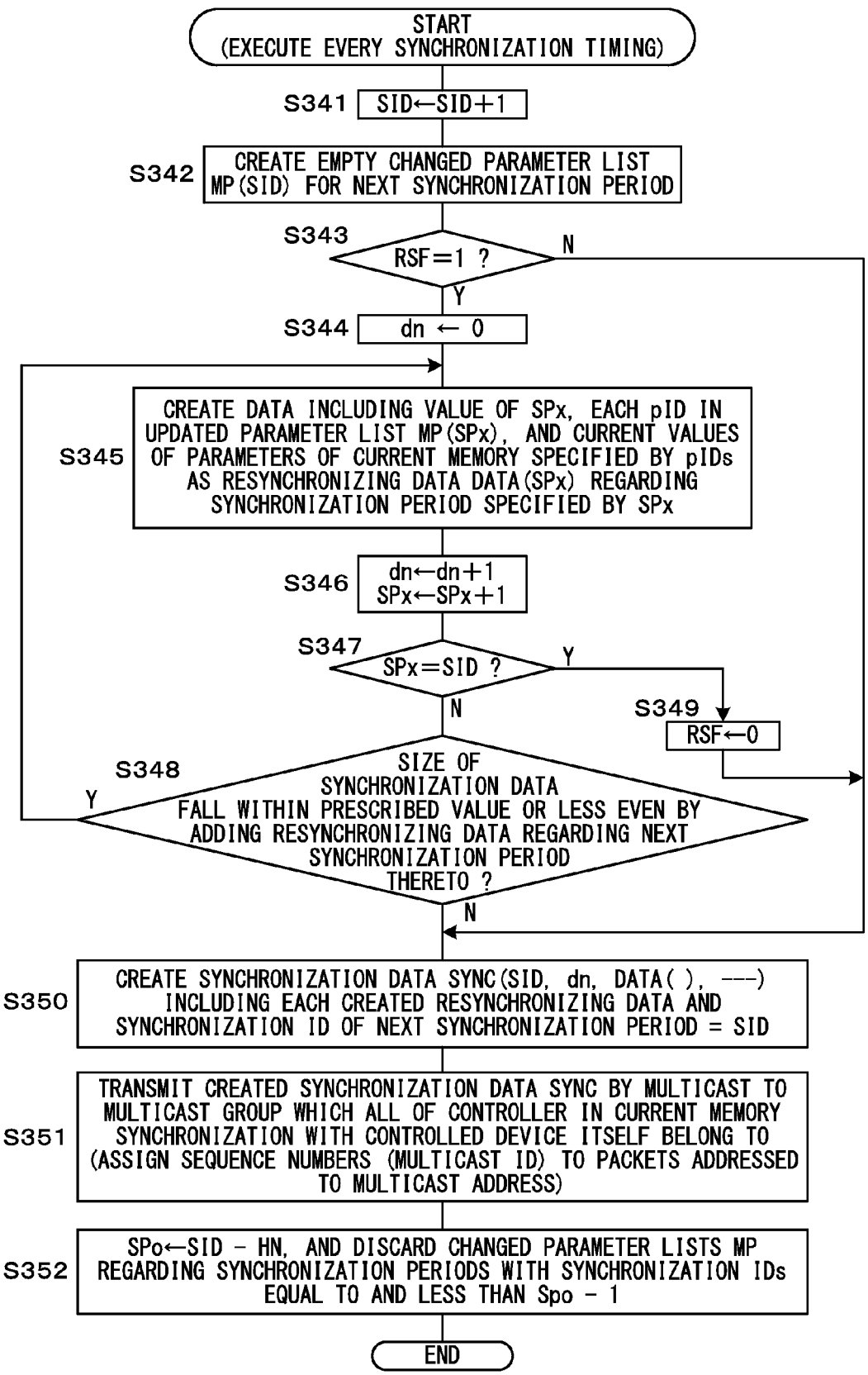
FIG. 20 is a flowchart of synchronization data transmission processing executed by the controlled device.

Next, a flowchart of synchronization data transmission processing executed by the CPU 201 or 301 of the controlled device 3 is illustrated in FIG. 20.

At a predetermined synchronization timing to complete the current synchronization period and shift to the next synchronization period, the controlled device 3 starts the processing illustrated in FIG. 20. The length of the synchronization period is controlled to be constant (with slight fluctuation) but may be made to be variable depending on the situation.

In this processing, the controlled device 3 first increments the value of the SID being the synchronization ID by 1 to express that it is in the next synchronization period (S341) and creates an empty changed parameter list MP(SID) for the synchronization period (S342).

When the RSF is 1 (YES in S343), the controlled device 3 then executes the processing in Steps 344 to S349 so as to prepare the parameter values to be transmitted to the controller 2 in response to the correction data request REQ_SYNC.

Here, the controlled device 3 sets a variable dn for counting the number of pieces of created resynchronizing data to the initial value 0 (S344), and then creates resynchronizing data indicating the parameter values changed in the synchronization period, in each synchronization period basis in order from the synchronization period specified by the SPx that is the earliest synchronization period for which it is necessary to transmit the parameter values to the controller 2.

More specifically, for each of the pIDs registered in the updated parameter list MP(SPx), the controlled device 3 first reads the current values of the parameters specified by the pID from the current memory and creates data including the value of the SPx, each pID in the updated parameter list MP(SPx), and the current values of the read parameters regarding the pID (the current values corresponding to the pID), as the resynchronizing data DATA(SPx) regarding the synchronization period specified by the SPx (S345).

The reason why not the values at the point in time of the synchronization period of synchronization ID=SPx but the current values are used here is that the resynchronizing data is for correcting the occurred data loss and matching the data of the virtual current memory with the data of the current memory to restore the synchronization of the current memory, not for faithfully reproducing the change process of the parameter value. Note that when no pID is registered in the updated parameter list MP(SPx), the controlled device 3 creates resynchronizing data DATA(SPx) including no pID and no current value.

After Step S345, the controlled device 3 increments each of dn and SPx by 1 (S346). Then the controlled device 3 returns to Step S345 when the SPx does not reach SID (YES in S347) and the size of the synchronization data SYNC falls within a prescribed value or less even by adding the resynchronizing data regarding the next synchronization period thereto (YES in S348), and creates the resynchronizing data regarding the next synchronization period (the synchronization period whose synchronization ID is the SPx incremented by 1).

If SPx=SID in Step S347, which means that the resynchronizing data also for the most recent synchronization period has been created, showing that there is no more parameter value to be transmitted to the controller 2, the controlled device 3 sets the RSF to 0 representing that fact (S349), and proceeds to Step S350.

If NO in Step S348, the controlled device 3 cannot add the resynchronizing data any more, decides to perform creation and transmission of the resynchronizing data thereafter at the next synchronization timing and proceeds to Step S350 with the value of RSF being 1.

If NO in Step S343, the controlled device 3 proceeds to Step S350 without creating the resynchronizing data.

In any case, the controlled device 3 creates the synchronization data SYNC (SID, dn, DATA( ) - - - ) including each resynchronizing data DATA created in Step S345, the number of pieces of the resynchronizing data dn (possibly 0), and the synchronization ID of the next synchronization period (=SID) in Step S350. For example, in the example in FIG. 19(a), the controlled device 3 creates the synchronization data including the resynchronizing data regarding the synchronization periods with the value of the synchronization IDs being 9 designated by the correction data request to 11 at the most recent to the synchronization data transmission. In the example of FIG. 19(b), since the synchronization ID at the most recent to the synchronization data transmission is 12, the controlled device 3 creates the synchronization data including the resynchronizing data regarding the synchronization periods with the synchronization IDs being 9 to 12.

Then, the controlled device 3 transmits the created synchronization data to the multicast address allocated thereto (S351). In this event, the controlled device 3 assigns multicast IDs being sequence numbers to the packets transmitted by the multicast (addressed to the multicast address) in the process of managing actual data transmission as with Step S324 in FIG. 16.

Thereafter, the controlled device 3 sets the value of the SPo to SID minus HN and discards the changed parameter lists MP regarding the synchronization periods with synchronization IDs equal to and less than SPo minus 1 (S352), namely, discards the changed parameter lists MP regarding the synchronization periods other than the latest HN pieces thereof, and ends the processing.

The above processing ensures that every time the synchronization period ends, the controlled device 3 creates the synchronization data SYNC including the synchronization ID of the synchronization period and transmits the synchronization data SYNC to each of the controllers 2 by the multicast, and when the controlled device 3 has received the correction data request REQ_SYNC from one of the controllers 2, the controlled device 3 incorporates, for each synchronization period designated by the correction data request, the current values of the parameters whose values have been changed in the synchronization period into the synchronization data SYNC and transmits the resulting synchronization data SYNC.

Further, since the size of the synchronization data SYNC is made to fall within the prescribed value, some band which another device uses to transmit data or band which the controlled device 3 itself uses to transmit another data in the control network can be left. Further, limiting the changed parameter lists MP to be stored to those relating only to the limited HM synchronization periods enables suppression of the memory occupation.

Next, a flowchart of processing executed by the controller 2 upon receiving the synchronization data SYNC from the controlled device 3 is illustrated in FIG. 21.

Upon receiving the synchronization data SYNC (assuming that SID' as the synchronization ID and n' as the number of pieces of resynchronizing data are included therein) transmitted by the multicast from the controlled device 3 synchronized with the virtual device specified by the dID, the controller 2 activates the processing illustrated in the flowchart of FIG. 21. Note that when there is a communication error, not the processing in FIG. 21 but the processing in FIG. 18 is activated.

In the processing of FIG. 21, the controller 2 first judges whether or not SID'=SID(dID)+1, namely, the synchronization data received this time and the synchronization data received the last time have synchronization IDs being sequence numbers (S161).

If NO here, it is considered that the synchronization data between them is lost, and the controller 2 regards the situation as an error in the reception of packets and executes the processing illustrated in FIG. 18 as in the case where the multicast IDs are not sequence numbers (S162).

If some synchronization data was lost since some packet transmitted by the multicast was not received, the loss could be detected in the judgment in Step S144 in FIG. 17 since a skip occurs also in the multicast IDs. However, in the case where the transmission itself of the packet was not performed on the controlled device 3 side, it can be considered that the multicast IDs are sequence numbers even if some synchronization data is lost. Accordingly, the continuity of the synchronization IDs is also checked here. Note that when the processing in FIG. 18 is executed here, the controller 2 returns to the processing in FIG. 21 after the processing in FIG. 18 is finished, and proceeds to the processing including and after Step S163.

If YES in Step S161, which shows that there is no problem in the received synchronization data SYNC, the controller 2 immediately proceeds to the processing including and after Step S163.

In any case, the controller 2 updates the value of the SID (dID) to the value of the SID' in Step S163.

Next, the controller 2 judges whether or not SS(dID)≠2 or n'=0 (S164). If SS(dID)≠2, which means it is not necessary to restore the synchronization at the moment, and accordingly it is not necessary to refer to the resynchronizing data included in the received synchronization data SYNC, either. Further, when n'=0, it is found that there is originally no resynchronizing data to be referred to in the received synchronization data SYNC. Hence, the controller 2 immediately ends the processing in either case.

If NO in Step S164, the controller 2 judges whether or not the synchronization ID included in the earliest (a smallest synchronization ID value) resynchronizing data DATA included in the received synchronization data SYNC is equal to or less than the SPt(dID) (S165). If NO here, it is found that the resynchronizing data included in the synchronization data SYNC received this time cannot be used for restoration of the synchronization in the controller 2 (data relating to an older synchronization period is required). Accordingly, the controller 2 immediately ends the processing also in this case.

As such case, there is a conceivable one that the correction data request transmitted by the controller 2 itself is not reflected in the synchronization data this time because the arrival of the correction data request REQ_SYNC to the controlled device 3 was subsequent to the creation and transmission of the present synchronization data SYNC. However, even in this case, the synchronization can be restored if the controller 2 receives the synchronization data reflecting the correction data request transmitted by the controller 2, as the synchronization data at the next time and subsequent thereto.

Figure 22:
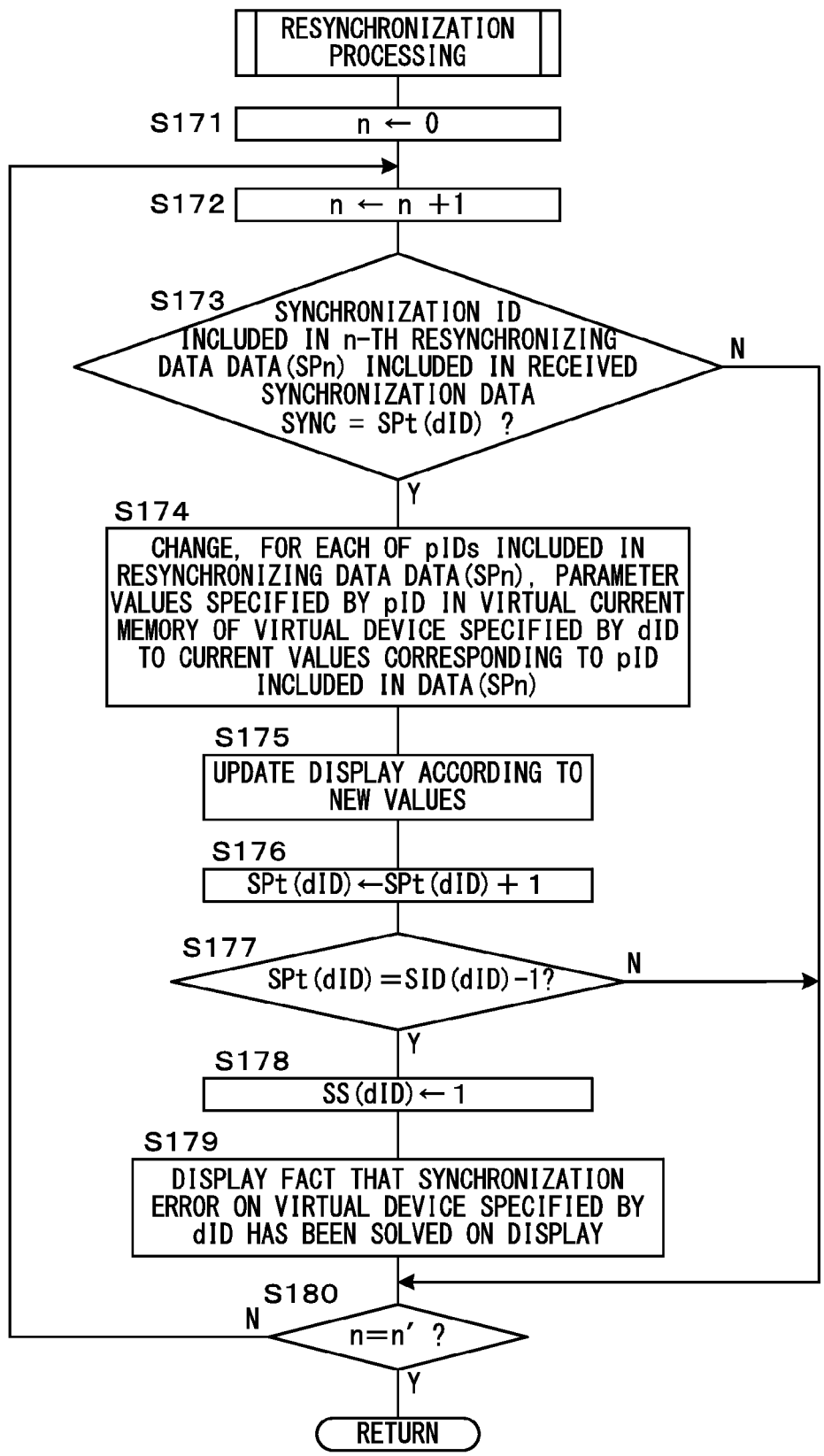
FIG. 22 is a flowchart of the resynchronization processing illustrated in FIG. 21.

On the other hand, if YES in S165, which means that the synchronization data including the resynchronizing data requested by the controller 2 using the correction data request REQ_SYNC to the controlled device specified by the dID is transmitted from the controlled device, the controller 2 stops the retransmission timer (dID) (S166) and performs resynchronization processing illustrated in FIG. 22(S167).

In the resynchronization processing, the controller 2 sequentially corrects the data loss using the n-th resynchronizing data DATA(SPn) included in the received synchronization data SYNC by the processing of Steps S173 to S179 while incrementing n by 1 from 1 to n' (S171, S172, S180). Here, it is assumed that the resynchronizing data having a smaller number is data regarding the synchronization period with a smaller value of the synchronization ID.

In the correction processing, the controller 2 judges whether or not the value of the synchronization ID included in the resynchronizing data DATA(SPn) is the SPt(dID) (S173). If NO here, which means that the n-th resynchronizing data is data in the synchronization period before the synchronization cannot be guaranteed any more, it is found that there is no need to refer to the data, and the controller 2 immediately proceeds to Step S180.

If YES in Step S173, the controller 2 changes, for each of the pIDs included in the resynchronizing data DATA(SPn), the parameter values specified by the pID in the virtual current memory of the virtual device specified by the dID to the current values corresponding to the pID included in the DATA (SPn) so as to reflect the n-th resynchronizing data in the virtual current memory (S174). Note that when no pID is included in the resynchronizing data DATA(SPn), parameter values are not changed. When parameter values are changed, the controller 2 updates the display of the parameter display screen 400 on the display according to the new values after the change (S175).

Thus, the values stored in the virtual current memory have been updated to the latest values in the controlled device 3 regarding the parameters whose values were changed in the synchronization period with a synchronization ID of SPt (dID). Therefore, even if a communication error occurred in the synchronization period, the controller 2 regards the damage in the synchronization due to the communication error as having been corrected, and increments the SPt(dID) by 1 (S176).

When SPt(dID)=SID(dID) at that time (YES in S177), the controller 2 regards that the controller has corrected all of the communication errors until the immediately preceding synchronization period and the synchronization of the current memory has been restored, and sets the SS(dID) to 1 indicating the restoration (S178), and further displays the fact that the synchronization error on the dID-th virtual device has been solved, by changing, for example, the synchronization lamp 403 on the parameter display screen 400 of the display from blinking to lighting (S179), and proceeds to Step S180.

On the other hand, if NO in Step S177, the controller 2 immediately proceeds to Step S180 in order to further try the restoration of synchronization using the next resynchronizing data.

If YES is established in Step S180, the controller 2 returns to the processing in FIG. 21 and ends the processing. Note that YES in Step S177 means that the DATA(SPn) relates to the immediately preceding the latest synchronization period, which is necessarily the last (=the n'-th) resynchronizing data, and therefore the judgment in Step 180 is YES.

The above processing in FIG. 21 and FIG. 22 ensures that upon receiving the synchronization data SYNC, the controller 2 stores the synchronization ID included in the synchronization data as the synchronization ID of the latest synchronization period, and if the information of the updated parameter values whose transmission have been requested to the controlled device 3 for restoration of synchronization is included in the synchronization data, the controller 2 corrects the data of the virtual current memory based on the information to restore the synchronization flawed due to the communication error.

For example, (a) of FIG. 19 is the example such that from the middle of the synchronization period ID of (9) in which the synchronization ID in one controlled device 3 is 9 to the middle of the synchronization period (11) in which the synchronization ID therein is 11, a communication error has occurred between the controlled device 3 and a controller 2, and the communication error is detected upon receiving the updated information UPDATE transmitted by the multicast in the middle of the synchronization period (11). At that time, the controller 2 transmits the correction data request REQ_SYNC(9) to the controlled device 3 by the unicast, and in response to that, the controlled device 3 adds the resynchronizing data DATA(9), DATA(10) and DATA(11) relating to the synchronization periods having values of the synchronization IDs from 9 to 11 to the synchronization data SYNC which is transmitted at the beginning of the next synchronization period (12), and then transmits the resulting data by the multicast. The controller 2 corrects the flaw on the synchronization of the virtual device associated with the controlled device 3 based on the received resynchronizing data.

Similarly, (b) of FIG. 19 is the example such that from the middle of the synchronization period (9) in one controlled device 3 to the end of the synchronization period (11), a communication error has occurred between the controlled device 3 and a controller 2, and the communication error is detected upon receiving the synchronization data SYNC transmitted by the multicast at the beginning of the next synchronization period (12). At that time, the controller 2 transmits the correction data request REQ_SYNC (9) to the controlled device 3 by the unicast, and in response to that, the controlled device 3 adds the resynchronizing data DATA(9) to DATA(12) relating to the synchronization periods having values of the synchronization IDs from 9 to 12 to the synchronization data SYNC which is transmitted at the beginning of the after-next synchronization period (13) and transmits the resulting data by the multicast to thereby correct the flaw on the synchronization of the virtual device associated with the controlled device 3. In this example, any communication error probably has not occurred in the synchronization period (12), but there is no inconvenience in particular in the change based on the resynchronizing data DATA(12) because the same current values are written over a part of the parameters.

Accordingly, even if using the multicast which does not provide the delivery guarantee for the transmission of the updated information UPDATE from the controlled device 3 to the controller 2, when the loss of data due to communication error or the like occurs, the controller 2 can detect and correct the loss of data in a short delay time that is about the length of the synchronization period and maintain the synchronization of the current memory to appropriately ensure the reliability of the transmission of the parameter values. The data which needs to be transmitted for monitoring error in addition to the minimum data required for transmitting result of change of the parameter values is only the multicast ID assigned to each packet and the synchronization data SYNC in the normal state without error, resulting in a small load on the communication band.

Note that the judgment in Step S173 may be omitted so that YES is established here at all times in the processing in FIG. 22. This is because even if the parameter value changed in the period in which synchronization can be guaranteed is reflected in the virtual current memory, the parameter value becomes the latest value in the controlled device 3, so that if there is synchronization, the parameter originally having the latest value is merely maintained and there is no problem in maintaining the synchronization. However, the processing including and after Step S174 is performed wastefully, thus possibly making the operation slightly slower.

If NO in Step S348 in FIG. 20 and thus the controlled device 3 could not incorporate the resynchronizing data until the latest synchronization period (SID-1) into the synchronization data SYNC (when terminated the incorporation of the resynchronizing data after the synchronization period specified by the SPx-1 in the middle), the correction until the synchronization period specified by the SPx-1 in the middle is performed in the resynchronization processing in FIG. 22 on the controller 2 side (SPt(dID)=SID(dID) is not established). In such a case, the RSF on the controlled device 3 side keeps 1, and the controlled device 3 incorporates the synchronizing data relating to the synchronization period specified by the subsequent SPx and the later synchronization period into the next synchronization data SYNC, and transmits the resulting data.

Further, the SS(dID) on the controller 2 side keeps 2, and upon receiving the next synchronization data SYNC, the controller 2 performs correction in the synchronization period specified by the subsequent SPx in the resynchronization processing in FIG. 22. In this manner, the requested resynchronizing data is transmitted dispersed in successive pieces of synchronization data SYNC and finally SPt(dID)=SID (dID) is established, and the synchronization of the virtual device is restored in the controller 2 (SS(dID) becomes 1).

Figure 23:
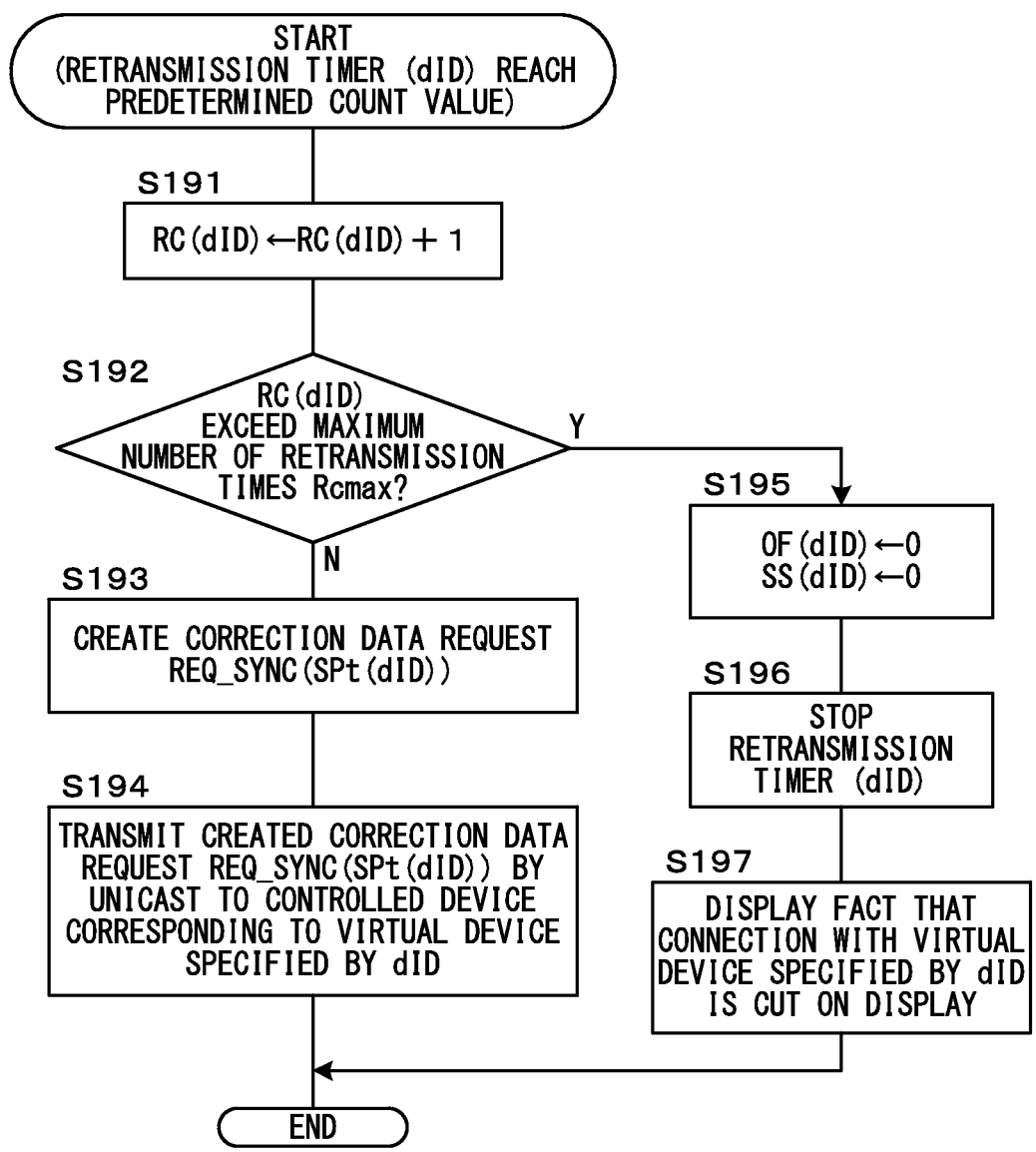
FIG. 23 is a flowchart of retransmission processing of a correction data request executed by the controller.

Next, a flowchart of retransmission processing of the correction data request executed by the controller 2 is illustrated in FIG. 23.

When the retransmission-timer (dID) detects the retransmission timing in each predetermined time about one of the dIDs, the controller 2 starts the processing illustrated in the flowchart of FIG. 23.

First, the controller 2 increments the retransmission counter RC(dID) by 1 (S191). If the RC(dID) does not exceed the maximum number of retransmission times RCmax (NO in S192), the controller 2 creates the correction data request REQ_SYNC (SPt(dID)) requesting transmission of the parameter values changed on the controlled device 3 side including and after the synchronization period with a value of the synchronization ID of SPt(dID) which have not been acquired yet, based on the SPt(dID) at that time (S193), transmits the correction data request REQ_SYNC (SPt(dID)) by the unicast to the controlled device 3 corresponding to the virtual device specified by the dID (S194), and ends the processing.

If YES in Step S192, the controller 2 recognizes that the connection with the controlled device 3 has been already cut and the controller 2 cannot acquire the resynchronizing data for restoring the synchronization from the controlled device 3, and sets the OF(dID) and the SS(dID) to 0 to bring the virtual device specified by the dID offline (S195). The controller 2 stops the retransmission timer (dID) (S196), and turns off the online lamp 402 and the synchronization amp 403 of the parameter display screen 400 of the virtual device specified by the dID to thereby display the fact that the virtual device and the controlled device associated therewith are out of synchronization (S197), and ends the processing.

The above processing ensures that the controller 2 repeatedly transmits the correction data request in each predetermined time until it receives all of data requested to the controlled device 3 in Step S153 in FIG. 18, and when the controller 2 cannot receive all of data even after a predetermined number of transmissions, the controller 2 can judge that the communication with the controlled device 3 has been cut.

If the synchronization of the current memory is suspended for a long time, many parameter values are changed in the controlled device 3 during the long time, possibly making the restoration of synchronization difficult. Hence, in such a case, it is preferable to once regard the connection as being cut and perform synchronization again by bulk dumping by the processing in FIG. 12 as necessary.

The explanation of the embodiment will end here, but the configurations of the devices, the kinds and numbers of the devices constituting the system, the data format, the concrete processing steps and the like are of course not limited to those descried in the above-described embodiment.

For example, the transfer of data relating to the remote control between the controller 2 and the controlled device 3 has been described as an example in the above embodiment, but the invention is also applicable to securement of the reliability when transmitting arbitrary data including the data not relating to the remote control to a plurality of devices by multicast.

Therefore, it is not essential that the devices exemplified as the controller 2 and the controlled device 3 in the above embodiment are in the relation that one of them remotely controls the other. For example, also in a system in which a first node corresponding to the controlled device 3 transmits data for display changing with time to a plurality of second nodes corresponding to the controllers 2 simultaneously in real time or at the similar timing, the reliability of the transmission can be ensured by the method similar to that of the above embodiment. More specifically, conceivable systems include the one displaying pictures and letters drawn on an electronic board by a teacher on terminals of a plurality of pupils, the one notifying the persons concerned in real time of the schedule of an event changing from moment to moment, and so on.

In this case, the second node is possibly a device displaying the data transmitted from the first node, a device merely storing the data, or a device executing some processing according to the data. For example, the invention is applicable to various systems such as a system monitoring data obtained by measurement at a plurality of measurement points by one or more measuring devices (first nodes), by a plurality of monitoring devices (second nodes) at a plurality of places, a security system managing the state(s) of one or more protection points at a plurality of places, a display system displaying the same data on a plurality of displays from one or more controllers, a broadcasting system broadcasting data from one or more broadcasting devices to a plurality of receiving devices, a conference system mutually transmitting the conversation and appearance of the conference conducted at a plurality of locations and so on.

In the case where it is only necessary for the second node to acquire the information of data newly added at the first node such as the data broadcasting system, it is unnecessary to provide a virtual current memory in the second node and therefore the processing in Step S112 in FIG. 12 is also unnecessary.

The virtual current memory with the same parameter configuration as that of the current memory of the controlled device 3 is prepared on the controller 2 side but may be omitted, and the controller 2 may prepare, in the RAM 103, a displaying buffer storing only the parameters displayed on the display 105. However, every time the parameters displayed on the parameter display screen 400 are changed, the controller 2 needs to reconfigure the displaying buffer and therefore deteriorates in response.

The synchronization ID assigned to synchronization data SYNC when the controlled device 3 transmits the synchronization data SYNC is information for matching the synchronization ID of the virtual device of the controller 2 synchronized with the controlled device 3 with the synchronization ID of the controlled device 3. It is best to assign the synchronization ID of a newly starting synchronization period at each synchronization timing as in the embodiment. However, as long as the same object can be achieved, another synchronization ID such as, for example, the synchronization ID of the previous synchronization period which ends at the point in time, the synchronization ID of the last-but-one synchronization period, or the synchronization ID in the future may be assigned, and this case is also within the scope of the invention.

In creating the resynchronizing data DATA(SID') of a synchronization period SID', as long as the same pID as the pID included in the updated parameter list MP(SID') of the synchronization period SID' is included in an updated parameter list MP(SID") of a later synchronization period SID", even if the pID is not included in the resynchronizing data DATA (SID'), there is no problem in the operation of the invention because the lack of the pID in the resynchronizing data DATA (SID') is corrected by the later synchronizing data DATA (SID").

The above-described modifications including those explained in the description of the embodiment are applicable in any combination without inconsistency. Conversely, the network system does not need to have all of the features explained in the description of the embodiment.

As is clear from the above description, the remote control system of the invention makes it possible, in the case where a plurality of controllers control the values of parameters of a controlled device connected thereto over a network or a plurality of varying data is transmitted from a first node to a plurality of second node, to reduce the number of packets transmitted out to the network to thereby reduce the required communication band of the network and the processing load on the controlled device, thereby reducing the load on the communication band (reducing the data amount to be transmitted), appropriately ensuring the reliability of transmission of the values of parameters, and monitoring the values of the parameters of the controlled device in the controllers with a slight time delay.

Therefore, application of the invention makes it possible to improve the convenience of the remote control system.

What is claimed is:

1. A remote control system comprising a plurality of controllers and a controlled device respectively connected to a network, wherein the controlled device comprises:
a current memory storing one set of parameters, operation of the controlled device being controlled according to vales of the parameters stored in the current memory,
each of the controllers comprises, regarding the controlled device which the controller controls, a virtual current memory storing one set of parameters having same configuration as the one set of parameters stored in the current memory of the controlled device, the virtual current memory being synchronized with the current memory such that respective values of the parameters stored in the virtual current memory become identical to the values of the corresponding parameters stored in the current memory,
at least one of the controllers accepts a user operation instructing to change a value of one parameter stored in the current memory of the controlled device, and transmits, to the controlled device by unicast, a change command to instruct the controlled device to change the value of the one parameter according to the accepted user operation,
the controlled device changes, when the controlled device receives the change command from any of the controllers, the value of the one parameter stored in the current memory according to the received change command, and transmits update information representing result of the change to the plurality of the controllers by multicast, and
each of the controllers updates, when the controller receives the update information from the controlled device, a value of a parameter stored in the virtual current memory according to the received update information, the controlled device comprises:

a timing generator for generating a synchronization timing periodically;

a synchronization ID generator for assigning synchronization IDs to respective synchronization periods from one synchronization timing to the next synchronization timing;

a change history memory for storing, when one or more values of one or more parameters in the current memory are changed in a synchronization period, one or more parameter IDs identifying the one or more parameters related to the synchronization period;

a synchronization data transmitter for creating, at each synchronization timing, synchronization data including a synchronization ID specifying a next synchronization period that begins at the synchronization timing, and transmitting the created synchronization data to the plurality of the controllers by multicast, the synchronization data transmitter comprises an incorporating device for a) judging, at each synchronization timing when one synchronization period finishes, whether or not the controlled device received the correction data request including a synchronization ID from any of the controllers in the one synchronization period, and b) if received, reading all the parameter IDs stored in the change history memory related to synchronization periods from the synchronization period specified by the synchronization ID included in the correction data request to the one synchronization period, and c) incorporating, as correction data, the values of the parameters specified by the respective read parameter IDs stored in the current memory into the synchronization data to be transmitted, and each of the controllers comprises:

a correction data requesting device for, when detecting error in receiving the update information or the synchronization data, transmitting a correction data request, requesting correction data, including the synchronization ID stored in the controller at a time of detecting the error, to the controlled device by unicast; and a synchronization data processor for, when the controller receives the synchronization data from the controlled device, storing the synchronization ID included in the received synchronization data, and if the correction data which the correction data requesting device requested is included in the received synchronization data, correcting one or more values of one of more parameters stored in the virtual current memory according to the correction data.

2. The remote control system according to claim 1, wherein the controlled device comprises a local operation acceptor for accepting a user operation instructing to change a value of one parameter stored in the current memory, and when the local operation acceptor accepts the operation instructing to change a value of one parameter, the controlled device changes the value of the one parameter stored in the current memory according to the accepted operation, transmits an update information representing result of the change to the plurality of the controllers by multicast, and stores a parameter ID identifying a parameter whose value is changed according to the accepted operation into the change history memory.

3. The remote control system according to claim 1, wherein among the plurality of the controllers, only one or more controllers comprising the virtual current memory are set up such that the controller receives the synchronization data and the update information which the controlled device transmits by the multicast.

4. The remote control system according to claim 1, wherein one multicast address is prepared in correspondence with the controlled device for use by the controlled device as a transmission destination of the multicast, and wherein the controllers which comprise the virtual current memory among the plurality of the controllers are set up such that the controller selectively receives data addressed to the multicast address corresponded to the controlled device.

5. A remote control system comprising a plurality of controllers and a plurality of controlled devices respectively connected to a network, wherein each of the controlled device comprises:

a current memory storing one set of parameters, operation of the controlled device being controlled according to vales of the parameters stored in the current memory, each of the controllers comprises, regarding each of the controlled devices which the controller controls among the plurality of the controlled devices, a virtual current memory corresponding to the controlled device storing one set of parameters having same configuration as the one set of parameters stored in the current memory of the corresponding controlled device, each of the virtual current memory being synchronized with the corresponding current memory such that respective values of the parameters stored in the virtual current memory become identical to the values of the corresponding parameters stored in the current memory in the corresponding controlled device, at least one of the controllers accepts a user operation instructing to change a value of one parameter stored in the current memory of one of the controlled device, and transmits, to the one controlled device by unicast, a change command to instruct the one controlled device to change the value of the one parameter according to the accepted user operation, the one controlled device changes, when the one controlled device receives the change command from any of the controllers, the value of the one parameter stored in the current memory according to the received change command, and transmits update information representing result of the change to the plurality of the controllers by multicast, and each of the controllers updates, when the controller receives the update information from one of the controlled devices, a value of a parameter stored in the virtual current memory corresponding to the one controlled device, according to the received update information, each of the controlled devices comprises:

a timing generator for generating a synchronization timing periodically;

a synchronization ID generator for assigning synchronization IDs to respective synchronization periods from one synchronization timing to the next synchronization timing;

a change history memory for storing, when one or more values of one or more parameters in the current memory are changed in a synchronization period, one or more parameter IDs identifying the one or more parameters related to the synchronization period; and a synchronization data transmitter for creating, at each synchronization timing, synchronization data including a synchronization ID specifying a next synchronization period that begins at the synchronization timing, and transmitting the created synchronization data to the plurality of the controllers by multicast, the synchronization data transmitter comprises an incorporating device for a) judging, at each synchronization timing when one synchronization period finishes, whether or not the controlled device received the correction data request including a synchronization ID from any of the controllers in the one synchronization period, and b) if received, reading all the parameter IDs stored in the change history memory related to synchronization periods from the synchronization period specified by the synchronization ID included in the correction data request to the one synchronization period, and c) incorporating, as correction data, the values of the parameters specified by the respective read parameter IDs stored in the current memory into the synchronization data to be transmitted, and each of the controllers comprises:

a correction data requesting device for, when detecting error in receiving the update information or the synchronization data transmitted from one of the controlled devices, transmitting a correction data request, requesting correction data, including the synchronization ID stored in correspondence with the one controlled device in the controller at a time of detecting the error, to the one controlled device by unicast; and a synchronization data processor for, when the controller receives the synchronization data from one of the controlled device, storing the synchronization ID included in the received synchronization data with correspondence with the one controlled device, and if the correction data which the correction data requesting device requested is included in the received synchronization data, correcting one or more values of one or more parameters stored in the virtual current memory corresponding to the one controlled device according to the correction data.

6. The remote control system according to claim 5, wherein at least one of the plurality of the controlled devices comprises a local operation acceptor for accepting a user operation instructing to change a value of one parameter stored in the current memory, and when the local operation acceptor of one controlled device accepts the operation instructing to change a value of one parameter, the one controlled device changes the value of the one parameter stored in the current memory according to the accepted operation, transmits an update information representing result of the change to the plurality of the controllers by multicast, and stores a parameter ID identifying a parameter whose value is changed according to the accepted operation into the change history memory.

7. The remote control system according to claim 5, wherein regarding each of the plurality of the controlled devices, among the plurality of the controllers, only one or more controllers comprising the virtual current memory corresponding to a certain controlled device are set up such that the controller receives the synchronization data and the update information which the certain controlled device transmits by the multicast.

8. The remote control system according to claim 5, wherein one multicast address is respectively prepared in correspondence with each of the plurality of the controlled devices for use by the controlled device as a transmission destination of the multicast, and wherein the controllers which comprise the virtual current memory corresponding to a certain controlled device among the plurality of the controllers are set up such that the controller selectively receives data addressed to the multicast address corresponded to the certain controlled device.

9. A communication system comprising a first node and a plurality of second nodes respectively connected to a network, wherein the first node comprises a first memory storing a plurality of first data which vary with time, the first node transmits, every time any of the first data varies, a variation notification indicating result of the variation of the first data to the plurality of the second nodes by multicast, each of the second nodes performs, when the second node receives the variation notification from the first node, a predetermined operation according to the received variation notification, the first node comprises:

a timing generator for generating a synchronization timing periodically;

a synchronization ID generator for assigning synchronization IDs to respective synchronization periods from one synchronization timing to the next synchronization timing;

a change history memory for storing, when any of the first data varies in each synchronization period, a data ID identifying the first data which varies, related to the synchronization period; and a synchronization data transmitter for creating, at end of each of the synchronization period, synchronization data including a synchronization ID specifying the next synchronization period, and transmitting the created synchronization data to the plurality of the second nodes by multicast, the synchronization data transmitter comprises an incorporating device for a) judging, when creating the synchronization data at the end of one synchronization period, whether or not the first node received the correction data request including a synchronization ID from any of the second nodes in the one synchronization period, and b) if received, reading all the data IDs stored in the change history memory related to the synchronization periods from the synchronization period specified by the synchronization ID included in the correction data request to the one synchronization period, and c) incorporating, as correction data, first data specified by the respective read data IDs among the first data stored in the first memory into the synchronization data to be transmitted, and each of the second nodes comprises:

a correction data requesting device for, when detecting error in receiving the update information or the synchronization data, transmitting a correction data request, requesting correction data, including the synchronization ID stored in the second node at a time of detecting the error, to the first node by unicast; and a synchronization data processor for, when the second node receives the synchronization data from the first node, storing the synchronization ID included in the received synchronization data, and if the correction data which the correction data requesting device requested is included in the received synchronization data, performing correction of the predetermined operation according to the correction data.

10. The communication system according to claim 9, wherein each of the second nodes comprises a device for judging whether or not an error occurs on the multicast communication by checking continuity of the synchronization ID included in the synchronization data when the second node receives the synchronization data.

11. The communication system according to claim 9, wherein
the first node comprises a device for assigning sequence numbers to data to be transmitted by the multicast, and
each of the second nodes comprises a device for judging whether or not an error occurs on the multicast communication by checking, when the second node receives the data, continuity of the sequence numbers assigned to the received data.

12. The communication system according to claim 9, wherein
a predetermined maximum size is determined for the synchronization data,
the incorporating device of the first node incorporates the first data into the synchronization data as a group of partial data respectively correspond to the synchronization periods, and
in a case where a size of the synchronization data exceeds the maximum size if the partial data corresponding to all of the synchronization periods requested by the received correction data request were incorporated in the synchronization data, the synchronization data transmitter determines to incorporate a part of the partial data into subsequent synchronization data, thereby reducing the size of the synchronization data to be transmitted to the maximum size or smaller.

13. The communication system according to claim 9, wherein
the second node which has transmitted the correction data request repeatedly transmits the same correction data request every predetermined time until the second node receives all the first data which the second node requested by the correction data request, and if the second node cannot receive all the first data which the second node requested by the correction data request even after transmitting the correction data request predetermined times, judges that communication between the second node and the first node is cut.

14. The communication system according to claim 9, wherein
the change history memory stores the data ID regarding a finite number of the synchronization period, and
the first node comprises a device for a) judging, when receiving the correction data request from the second node, whether or not the change history memory stores the data ID regarding all of the synchronization periods requested by the received correction data request, and b) if not, notifying the second node which sent the correction data request that connection between the second node and the first node is broken.

15. The communication system according to claim 9, wherein the predetermined operation each of the plurality of the second nodes performs according to the received variation notification is control of display according to the first data on a display device which the second node comprises.

16. The remote control system according to claim 1, wherein the remote control system further comprising one or more controlled devices same as the controlled device,
each of the controllers comprises, regarding each of one or more controlled devices which the controller controls among the plurality of the controlled devices, a virtual current memory corresponding to the controlled device storing one set of parameters having same configuration as the one set of parameters stored in the current memory of the corresponding controlled device, each of the virtual current memory being synchronized with the corresponding current memory such that the respective values of the corresponding parameters stored in the virtual current memory become identical to the values of the corresponding parameters stored in the current memory in the corresponding controlled device,
the correction data requesting device of each controller, when detecting error in receiving the update information or the synchronization data transmitted from one controlled device, transmits a correction data request, requesting correction data, including the synchronization ID stored in correspondence with the one controlled device in the controller at a time of detecting the error, to the one controlled device by unicast, and
the synchronization data processor of each controller, when the controller receives the synchronization data from one controlled device, stores the synchronization ID included in the received synchronization data with correspondence with the one controlled device, and if the correction data which the correction data requesting device requested is included in the received synchronization data, corrects one or more values of one or more parameters stored in the virtual current memory corresponding to the one controlled device according to the correction data.

* * * * *